(12) United States Patent
Nakanishi et al.

(10) Patent No.: US 9,159,985 B2
(45) Date of Patent: Oct. 13, 2015

(54) CIRCUIT BREAKER AND BATTERY PACK INCLUDING THE SAME

(75) Inventors: Yoshihiro Nakanishi, Naruto (JP); Shiro Shibuya, Naruto (JP); Kenta Kida, Naruto (JP)

(73) Assignee: OSTUKA TECHNO CORPORATION, Tokushima (JP)

( * ) Notice: Subject to any disclaimer, the term of this patent is extended or adjusted under 35 U.S.C. 154(b) by 446 days.

(21) Appl. No.: 13/479,824

(22) Filed: May 24, 2012

(65) Prior Publication Data

US 2012/0299690 A1 Nov. 29, 2012

(30) Foreign Application Priority Data

May 27, 2011 (JP) ................................. 2011-119600
Aug. 5, 2011 (JP) ................................. 2011-172356
Oct. 7, 2011 (JP) ................................. 2011-223466
Nov. 2, 2011 (JP) ................................. 2011-241724

(51) Int. Cl.
| | |
|---|---|
| *H01H 37/14* | (2006.01) |
| *H01H 37/64* | (2006.01) |
| *H01M 2/34* | (2006.01) |
| *H01H 37/04* | (2006.01) |
| *H01H 37/54* | (2006.01) |
| *H01M 2/02* | (2006.01) |
| *H01M 2/22* | (2006.01) |
| *H01M 10/42* | (2006.01) |

(52) U.S. Cl.
CPC .............. *H01M 2/348* (2013.01); *H01H 37/14* (2013.01); *H01H 37/043* (2013.01); *H01H 37/5436* (2013.01); *H01H 37/64* (2013.01); *H01M 2/0217* (2013.01); *H01M 2/22* (2013.01); *H01M 10/425* (2013.01); *H01M 2200/101* (2013.01)

(58) Field of Classification Search
CPC . H01H 37/14; H01H 37/043; H01H 37/5436; H01H 37/64; H01M 2/348; H01M 2200/101; H01M 2/22; H01M 10/425; H01M 2/0217
USPC ..................... 337/38, 102, 372, 333, 362, 380
See application file for complete search history.

(56) References Cited

U.S. PATENT DOCUMENTS

| 1,728,045 A | * | 9/1929 | Dubilier ........................... 338/24 |
| 3,430,177 A | * | 2/1969 | Audette ......................... 337/365 |
| 3,443,259 A | * | 5/1969 | Wehl et al. ....................... 337/89 |

(Continued)

FOREIGN PATENT DOCUMENTS

| EP | 2541576 A1 * | 1/2013 | ............. H01H 37/54 |
| JP | 10-21805 | 1/1998 | |

(Continued)

*Primary Examiner* — Anatoly Vortman
(74) *Attorney, Agent, or Firm* — Wenderoth, Lind & Ponack, L.L.P.

(57) ABSTRACT

A breaker includes a fixed metal plate, a moving metal plate, a bimetal, and a heater. The fixed plate includes a fixed contact in a space of an exterior case having an electrically-insulating case and an exterior metal plate. The exterior plate and the fixed plate are arranged opposed to each other, and fixed to the electrically-insulating case. The bimetal has a convex shape, and is arranged between the heater and the moving plate. The electrically-insulating case includes first and second outer walls and protruding from the both ends of the case. A central part of the fixed plate is fixed to the first outer wall, and a part of moving plate is fixed to the second outer wall. The exterior plate closes the opening of the space.

3 Claims, 23 Drawing Sheets

(56) References Cited

U.S. PATENT DOCUMENTS

| | | | |
|---|---|---|---|
| 4,149,138 A * | 4/1979 | Pevzner et al. | 337/372 |
| 4,414,529 A * | 11/1983 | Yoshioka et al. | 337/36 |
| 4,539,545 A * | 9/1985 | Klotz | 337/380 |
| 4,620,175 A * | 10/1986 | Karr et al. | 337/343 |
| 4,822,560 A * | 4/1989 | Oyama et al. | 420/470 |
| 4,862,133 A * | 8/1989 | Tabei | 337/102 |
| 4,894,634 A * | 1/1990 | Nezuka et al. | 337/343 |
| 5,233,325 A * | 8/1993 | Takeda | 337/107 |
| 5,268,664 A * | 12/1993 | Givler | 337/380 |
| 5,337,036 A * | 8/1994 | Kuczynski | 337/343 |
| 5,428,336 A * | 6/1995 | Smith et al. | 337/365 |
| 5,621,376 A * | 4/1997 | Takeda | 337/372 |
| 5,659,285 A * | 8/1997 | Takeda | 337/389 |
| 5,757,262 A * | 5/1998 | Takeda | 337/380 |
| 5,804,798 A * | 9/1998 | Takeda | 219/511 |
| 5,847,637 A * | 12/1998 | Takeda et al. | 337/344 |
| 5,939,970 A * | 8/1999 | Tsuji et al. | 337/343 |
| 6,020,807 A * | 2/2000 | Givler | 337/377 |
| 6,064,295 A * | 5/2000 | Becher et al. | 337/349 |
| 6,281,780 B1 * | 8/2001 | Sugiyama et al. | 337/137 |
| 6,334,915 B1 * | 1/2002 | Ogura et al. | 148/435 |
| 6,335,113 B1 * | 1/2002 | Nakatani et al. | 429/90 |
| 6,396,381 B1 * | 5/2002 | Takeda | 337/377 |
| 6,515,571 B2 * | 2/2003 | Takeda | 337/375 |
| 6,633,222 B2 * | 10/2003 | Nagai et al. | 337/365 |
| 6,756,876 B2 * | 6/2004 | Sullivan et al. | 337/111 |
| 6,801,116 B2 * | 10/2004 | Oh et al. | 337/112 |
| 6,995,647 B2 * | 2/2006 | Stiekel | 337/112 |
| 7,026,907 B2 * | 4/2006 | Takeda | 337/85 |
| 7,075,403 B2 * | 7/2006 | Unno et al. | 337/365 |
| 7,292,131 B2 * | 11/2007 | Masuda | 337/365 |
| 7,330,097 B2 * | 2/2008 | Takeda | 337/102 |
| 7,952,330 B2 * | 5/2011 | Mori | 320/150 |
| 8,289,124 B2 * | 10/2012 | Hofsaess | 337/372 |
| 2001/0050609 A1 * | 12/2001 | Takeda | 337/333 |
| 2002/0003465 A1 | 1/2002 | Takeda | |
| 2003/0122650 A1 * | 7/2003 | Yamamoto et al. | 337/333 |
| 2004/0100351 A1 * | 5/2004 | Unno et al. | 337/100 |
| 2007/0131321 A1 * | 6/2007 | Kaneko et al. | 148/685 |
| 2008/0116851 A1 * | 5/2008 | Mori | 320/134 |
| 2008/0175746 A1 * | 7/2008 | Era et al. | 420/485 |
| 2008/0190523 A1 * | 8/2008 | Gao et al. | 148/682 |
| 2009/0035174 A1 * | 2/2009 | Era et al. | 420/473 |
| 2010/0000637 A1 * | 1/2010 | Hatano | 148/685 |
| 2010/0066478 A1 * | 3/2010 | Hofsaess | 337/372 |
| 2010/0086435 A1 * | 4/2010 | Era | 420/476 |
| 2011/0005644 A1 * | 1/2011 | Matsuo et al. | 148/435 |
| 2011/0073221 A1 * | 3/2011 | Kaneko et al. | 148/554 |

FOREIGN PATENT DOCUMENTS

| | | |
|---|---|---|
| JP | 2001-351490 | 12/2001 |
| JP | 2003-077441 | 3/2003 |
| JP | 2003-109580 | 4/2003 |
| JP | 2003-282047 | 10/2003 |
| JP | 2005-129471 | 5/2005 |
| JP | 2005-203277 | 7/2005 |
| JP | 2006-100054 | 4/2006 |
| JP | 2006-338927 | 12/2006 |

* cited by examiner

CIRCUIT BREAKER AND BATTERY PACK INCLUDING THE SAME

CROSS-REFERENCE TO RELATED APPLICATIONS

The present application claims priority under 35 U. S. C. §119 to Japanese Patent Application No. 2011-119,600 filed on May 27, 2011, Japanese Patent Application No. 2011-172, 356 filed on Aug. 5, 2011, Japanese Patent Application No. 2011-223,466 filed on Oct. 7, 2011, and Japanese Patent Application No. 2011-241,724 filed on Nov. 2, 2011. The contents of these applications are incorporated herein by references in their entirety.

BACKGROUND OF THE INVENTION

1. Field of the Invention

The present invention relates to a circuit breaker to be arranged in an electric device, typically in a battery pack or the like, for cutting off the flow of current when the temperature becomes higher than a predetermined temperature, and a battery pack including this circuit breaker.

2. Description of the Related Art

Devices such as battery pack and electric motor can cut off the flow of current to improve safety if the temperature becomes abnormally high. To achieve this, a circuit breaker is used which switches a contact to OFF when the temperature reaches a predetermined temperature. For example, in the case where battery packs including a lithium ion battery are charge/discharge in abnormal conditions, the temperature will be high. Accordingly, a circuit breaker is provided for cutting off the flow of current at the occurrence of an abnormally high temperature so that battery packs can be safely used. Also, the temperature may rise abnormally if electric motors are brought into an overload state or in an abnormal current state where abnormal current flows in electric motors. Accordingly, a circuit breaker is provided for cutting off the flow of current in such abnormal states and protecting electric motors so that electric motors can be safely used. A circuit breaker has been developed which used in the above applications for cutting off the flow of current in the abnormal state (see Japanese Patent Laid-Open Publication No. JP2006-100, 054 A).

This circuit breaker is a flow-via-bimetal type circuit breaker which includes a bimetal 108 as moving contact metal plate 106, as shown in FIG. 1. Since the bimetal 108 serves as the moving contact metal plate 106 in this circuit breaker, there is a disadvantage that the bimetal increases the electrical resistance of the moving contact metal plate 106. In this flow-via-bimetal type circuit breaker, after the moving contact metal plate 106 of the bimetal 108 deforms so that the flow of current is cut off at high ambient temperature, when the ambient temperature decreases so that the bimetal 108 returns to the original position, the moving contact 107 contacts a fixed contact 105 again so that the circuit breaker returns to ON. If this circuit breaker is used for a battery pack, for example, although the flow of current is cut off when a battery has an abnormal temperature, the current will flow again when the temperature of the battery decreases. For this reason, the battery pack may not be safely used. In the case where a circuit breaker is used for battery packs or electric motors, and these devices are heated to an abnormal temperature, the flow of current is cut off. In the state where the flow of current is cut off, the devices are in an abnormal state. For this reason, in order to safely use the devices, it is necessary to hold the circuit breaker in the current-cutting-off state after the flow of current is cut off.

In order to solve a disadvantage of the aforementioned circuit breaker, a bimetal circuit breaker has been developed which includes a bimetal and a moving contact metal plate as separated metal plates, and additionally includes a heater for heating the bimetal (see Japanese Patent Laid-Open Publication No. JP2006-338,927 A).

FIG. 2 shows this bimetal circuit breaker disclosed in JP2006-338,927 A. In this circuit breaker, a bimetal 208 is provided between a fixed contact metal plate 204 and a moving contact metal plate 206. The fixed contact metal plate 204 includes a fixed contact 205. The moving contact metal plate 206 includes a moving contact 207 which can contact this fixed contact 205. In this bimetal circuit breaker, if the ambient temperature becomes high, the bimetal 208 will deform into an inverted shape (will bend toward the opposite direction) so that the moving contact 207 is disconnected from the fixed contact 205 whereby cutting off the flow of current. This circuit breaker additionally includes a heater 209 which heats the bimetal 208 in abnormal states. In this circuit breaker, if a protection circuit or the like detects abnormal states of a battery, current is applied to the heater by means of a switching device of the protection circuit so that the bimetal can be heated whereby cutting off the flow of current. Also, this bimetal can bend so that the flow of current is cut off if the ambient temperature becomes high. Accordingly, it is possible to cut off the flow of current without applying current to the heater if high ambient temperature is detected. In addition, in the circuit breaker which includes the heater, after the ambient temperature becomes high, this circuit breaker cuts off the current, and additionally can keep cutting off the flow of current by applying current to the bimetal (by heating the bimetal). Thus, the circuit breaker disclosed in JP2006-338, 927 A can cut off the flow of current based on the ambient temperature, and the abnormal state detection detected by the protection circuit, and the like. In addition, this circuit breaker can keep cutting off the flow of current by applying current to the bimetal (by heating the bimetal).

The bimetal circuit breaker disclosed in JP2006-338,927 A bends the bimetal toward the opposite direction based on the ambient temperature so that the moving contact is disconnected from the fixed contact whereby cutting off the flow of current. In the bimetal circuit breaker, since the bimetal serves as a metal plate provided separately from the moving contact metal plate, and deforms into an inverted shape whereby disconnecting the moving contact from the fixed contact, this deformation is likely to cause time delay. The reason is that it takes time to thermally conduct the ambient temperature to the bimetal, which is arranged inside the moving contact metal plate. In such a bimetal circuit breaker, which cuts off the current based on the temperature, the circuit breaker cuts off the flow of current when an abnormal temperature is detected. Accordingly, the circuit breaker is required to cut off the flow of current as soon as possible when the ambient temperature rises to a predetermined temperature. That is, if deformation of bimetal into an inverted shape is delayed when the ambient temperature quickly rises, the battery or the electric motor may be damaged. This problem can be prevented by setting the deformation temperature of bimetal lower. However, in the case where the bimetal circuit breaker cuts off the flow of current at a lower temperature, there is a problem that the flow of current will be cut off even if the battery or the electric motor is used for a long time in a proper state (e.g., where the battery or the electric motor operates without adverse thermal influence). In addition, since the bimetal is deformed into an inverted shape by thermal expansion difference between laminated metal layers of the bimetal, it is difficult to construct a bimetal which deforms into an inverted shape at lower temperature. From this viewpoint, for the cutoff temperature in which the circuit breaker actuates and cuts off the current of the battery or the electric motor, it is important to set the cutoff temperature as high as possible in the range where no problem arises but lower than the temperature where a problem arises. Accordingly, the circuit breaker is required to have the characteristic which quickly cuts off the flow of current at a temperature lower than the temperature which damages the device.

It is a first object of the present invention to provide a bimetal circuit breaker which has the above characteristic, that is, which includes a moving contact metal plate and a bimetal as separated metal plates whereby reducing the ON resistance, and can quickly cut off the flow of current when abnormality arises, and a battery pack which includes this circuit breaker.

On the other hand, there is a disadvantage that the thickness of a bimetal circuit breaker will be large because the breaker includes a moving contact metal plate and a bimetal as separated metal plates (i.e., whereby reducing the ON resistance), and additionally includes a heater for heating the bimetal, as shown in FIG. 2. Since bimetal circuit breakers are often built in devices such as battery pack, it is required to reduce the thickness of bimetal circuit breakers so that bimetal circuit breaker can be built in even a small device.

It is a second object of the present invention to provide a bimetal circuit breaker which has the above characteristic, that is, which has a small thickness as a whole, and can quickly cut off the flow of current based on the ambient temperature, and a battery pack which includes this circuit breaker.

SUMMARY OF THE INVENTION

A bimetal circuit breaker of the present invention includes an exterior case 1, a fixed contact metal plate 4, a moving contact metal plate 6, a bimetal 8, and a heater 9. The exterior case 1 includes an electrically-insulating case 2 of plastic, and an exterior metal plate 3. The fixed contact metal plate 4 includes a fixed contact 5 fixed to the electrically-insulating case 2 of the exterior case 1. The moving contact metal plate 6 is fixed to the electrically-insulating case 2, and includes a moving contact 7 arranged at the position opposed to the fixed contact 5. The bimetal 8 switches the moving contact metal plate 6 from ON to OFF. The heater 9 heats the bimetal 8. The exterior metal plate 3 and the fixed contact metal plate 4 are arranged at the positions opposed to each other, and are fixed to the electrically-insulating case 2. The heater 9, the bimetal 8, and the moving contact metal plate 6 are arranged between the fixed contact metal plate 4 and the exterior metal plate 3 in this order from the fixed contact metal plate 4 side. The bimetal 8 has a convex shape the center of which protrudes, and is arranged between the heater 9 and the moving contact metal plate 6 with the central protruding portion protruding toward the moving contact metal plate 6 with the moving contact 7 being in contact with the fixed contact 5. The electrically-insulating case 2 includes first and second outer walls 11A and 11B that protrude from the both ends of the electrically-insulating case 2. An accommodation space portion 20 is formed between the first and second outer walls 11A and 11B, and accommodates the heater 9, the bimetal 8 and the moving part 6A of the moving contact metal plate 6. A central part 4B of the fixed contact metal plate 4 is fixed to the first outer wall 11A. A part of the moving contact metal plate 6 is fixed to the second outer wall 11B. The exterior metal plate 3 is fixed to the electrically-insulating case 2, and closes the opening of the accommodation space portion 20. The accommodation space portion 20 of the electrically-insulating case 2 is closed with the exterior metal plate 3 being exposed on the exterior surface side.

Although the bimetal circuit breaker includes the moving contact metal plate and the bimetal as separated metal plates whereby reducing the ON resistance, it is possible to quickly cut off the flow of current when abnormality arises. The reason is that the bimetal circuit breaker has a unique structure in which the exterior case includes the electrically-insulating case of plastic and the exterior metal plate, and the accommodation space portion is formed between the first and second outer walls, and accommodates the heater, the bimetal and the moving part of the moving contact metal plate, after that the both ends of the exterior metal plate are fixed to the first and second outer walls so that the accommodation space portion is closed.

In addition, although the bimetal circuit breaker includes the bimetal as a separated metal plate separately provided from the moving contact metal plate, and the heater for heating the bimetal, the bimetal circuit breaker has a small thickness as a whole, and can quickly cut off the flow of current.

In a bimetal circuit breaker according to another aspect of the present invention, the exterior metal plate 3 can be fixed to the electrically-insulating case 2 with one end of the exterior metal plate 3 being arranged on and in contact with the stationary part 6B of the moving contact metal plate 6.

According to the bimetal circuit breaker, since the exterior metal plate is directly arranged on and in contact with the moving contact metal plate, it is possible to further reduce the entire thickness of the bimetal circuit breaker. In addition, the exterior metal plate can also serve as a contact of the moving contact metal plate.

In a bimetal circuit breaker according to another aspect of the present invention, the exterior metal plate 3 can be adhered onto the outer wall 11, or can be fixed to the outer wall 11 with the exterior metal plate 3 being penetrated by a connection rib 15 that is integrally formed with the outer wall 11.

According to the bimetal circuit breaker, since the exterior metal plate is adhered onto the electrically-insulating case, or is fixed to the electrically-insulating case by using the connection rib arranged on the outer wall of the electrically-insulating case, it is possible to securely fix the exterior metal plate to the electrically-insulating case, although the entire thickness of the bimetal circuit breaker can be small.

In a bimetal circuit breaker according to another aspect of the present invention, the electrically-insulating case 2 can include a connection rib 15 for connecting the exterior metal plate 3. The connection rib 15 can be integrally formed with the electrically-insulating case 2, and can protrude from the end surface of the outer wall 11. The exterior metal plate 3 can include a penetration hole 25 that is penetrated by the connection rib 15, which is arranged in the electrically-insulating case 2. The exterior metal plate 3 can be fixed to the electrically-insulating case 2 with the connection rib 15 being inserted into the penetration hole 25.

According to the bimetal circuit breaker, the exterior metal plate can be securely fixed to the electrically-insulating case.

In a bimetal circuit breaker according to another aspect of the present invention, penetration holes 25 can be formed in four corner parts of the exterior metal plate 3. Connection ribs 15 to be inserted into the penetration holes 25 can be arranged on the end surface of the outer wall 11 of the electrically-insulating case 2.

According to the bimetal circuit breaker, although the thickness of the external shape of the bimetal circuit breaker can be small, the exterior metal plate can be more securely fixed to the electrically-insulating case.

In a bimetal circuit breaker according to another aspect of the present invention, the stationary part 6B of the moving contact metal plate 6 can be sandwiched and fixed between the end surface of the second outer wall 11B of the exterior case 1, and the exterior metal plate 3. The penetration holes 25 can be formed on the both sides of the exterior metal plate outside the fixed contact metal plate 4 and the moving contact metal plate 6.

According to the bimetal circuit breaker, the exterior metal plate can be securely fixed, and the moving contact metal plate can be securely fixed.

In a bimetal circuit breaker according to another aspect of the present invention, the electrically-insulating case 2 can include opposed walls 12 that are arranged along the both sides of the accommodation space portion 20, and can be coupled to the first and second outer walls 11A and 11B. The opposed walls 12 and the outer walls 11 can compose an enclosing wall 10 for enclosing the accommodation space portion 20. The exterior metal plate 3 can include bent side walls 22 that are arranged on the both sides and are bent along the external surfaces of the opposed walls 12. The bent side wall 22 and the opposed wall 12 can be connected to each other by interlock structures.

According to the bimetal circuit breaker, although the exterior metal plate 3 can be more securely fixed to the electrically-insulating case 2, it is possible to reduce the entire thickness of the bimetal circuit breaker.

In a bimetal circuit breaker according to another aspect of the present invention, the interlock structures of the bent side walls 22 and the opposed walls 12 can include interlock protruding portions 16 that are arranged on the exterior sides of the opposed walls 12, and interlock holes 26 that are formed in the bent side walls 22, and guide and interlock with the interlock protruding portions 16.

According to the bimetal circuit breaker, the exterior metal plate 3 can be simply and easily, but securely fixed to the electrically-insulating case 2.

The above and further objects of the present invention as well as the features thereof will be more apparent from the following detailed description to be made in conjunction with the accompanying drawings.

DETAILED DESCRIPTION OF THE INVENTION

Figure 1:
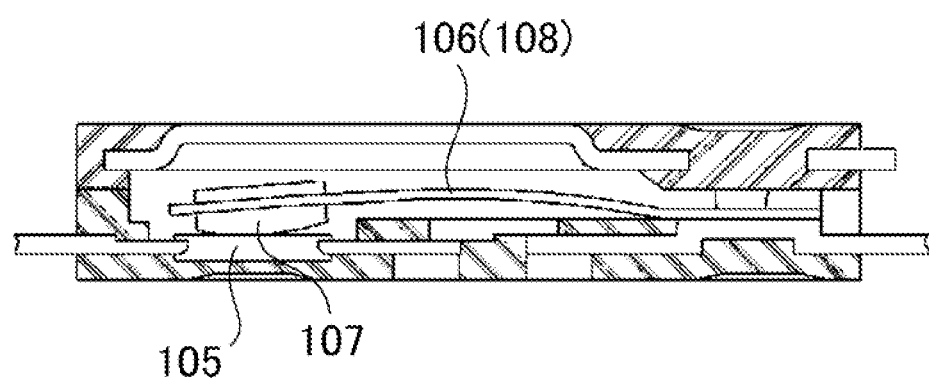
FIG. 1 is a cross-sectional view showing a known circuit breaker.
Figure 2:
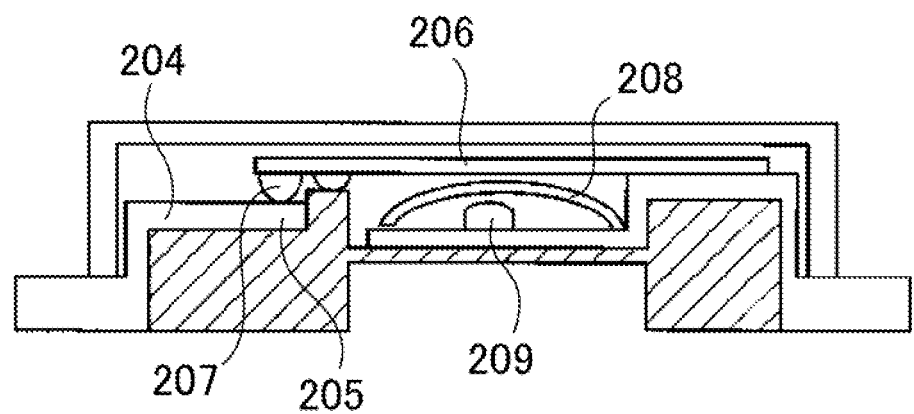
FIG. 2 is a cross-sectional view showing another known circuit breaker.
Figure 3:
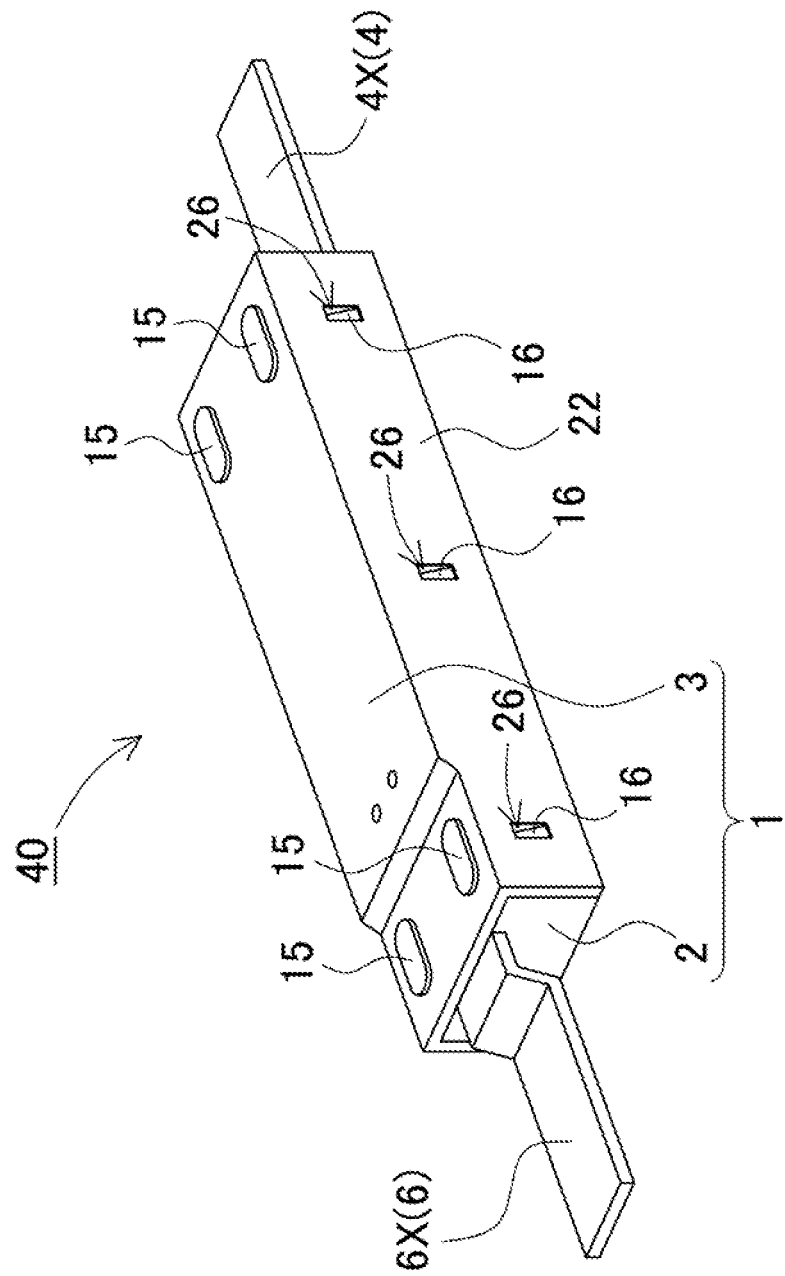
FIG. 3 is a perspective view of a bimetal circuit breaker according to an embodiment of the present invention.

The following description will describe embodiments according to the present invention with reference to the drawings. It should be appreciated, however, that the embodiments described below are illustrations of a bimetal circuit breaker used therein to give a concrete form to technical ideas of the invention, and a bimetal circuit breaker of the invention is not specifically limited to description below. In this specification, reference numerals corresponding to components illustrated in the embodiments are added in "Claims" and "SUMMARY OF THE INVENTION" to aid understanding of claims. However, it should be appreciated that the members shown in claims attached hereto are not specifically limited to members in the embodiments.

The following bimetal circuit breakers can be included mainly in battery packs, and include a bimetal which deforms and cuts off the current when the battery temperature or the ambient temperature becomes high, or when the battery pack is used in abnormal states. In particular, since the bimetal circuit breaker according to the present invention includes a heater which heats the bimetal, the bimetal circuit breaker can be suitably used to keep heating the bimetal by means of the heater whereby keeping cutting off the flow of current. However, the applications for the bimetal circuit breaker according to the present invention are not limited to battery packs. For example, the applications for the bimetal circuit breaker according to the present invention can be used for applications such as electric motor applications in which the flow of current is cut off based on temperature rise detection.

A bimetal circuit breaker 40 shown in FIGS. 3 to 8 includes an exterior case 1, a fixed contact metal plate 4, a moving contact metal plate 6, a bimetal 8, and a heater 9. The fixed contact metal plate 4 and the moving contact metal plate 6 are fixed to the exterior case 1. The bimetal 8 deforms the moving contact metal plate 6. The heater 9 heats the bimetal 8.

The exterior case 1 includes an electrically-insulating case 2 of plastic, and an exterior metal plate 3. The fixed contact metal plate 4 is fixed by insert molding to a bottom 13 of the electrically-insulating case 2 of the exterior case 1. The exterior metal plate 3 is fixed to the upper surface of the exterior case. The electrically-insulating case 2 includes first and second outer walls 11A and 11B that protrude from the both ends of the electrically-insulating case 2. An accommodation space portion 20 is formed between the first and second outer walls 11A and 11B. The bottom of the accommodation space portion 20 is closed by the fixed contact metal plate 4, which is fixed by insert molding, while the upper surface is closed by the exterior metal plate 3. Thus, the fixed contact metal plate 4 is exposed in the bottom surface of the exterior case 1, while the exterior metal plate 3 is exposed in the upper surface. The exterior metal plate 3 is fixed to the electrically-insulating case 2 of plastic not by insert molding so that substantially the entire surface of the exterior metal plate is exposed in the upper surface side.

The electrically-insulating case 2 includes opposed walls 12 which are connected to the first and second outer walls 11A and 11B. Thus, the opposed walls 12 and the exterior walls 11 compose an enclosing wall 10 which surrounds the accommodation space portion 20. Thus, the periphery of the accommodation space portion 20 is enclosed by the enclosing wall 10. The bottom is closed by the fixed contact metal plate 4. In addition, the upper surface is closed by the exterior metal plate 3. As a result, the circuit breaker has closed, hollow space.

In the electrically-insulating case 2, a part of the fixed contact metal plate 4 is fixed by insert molding to a middle part of the first outer wall 11A. In the case shown in FIGS. 4 and 5, a central part 4B of the fixed contact metal plate 4 is fixed to a middle part of the first outer wall 11A. Thus, the fixed contact metal plate 4 is fixed to the electrically-insulating case 2 with the fixed contact metal plate 4 penetrating the first outer wall 11A. A fixed contact 5 corresponds to a part of the fixed contact metal plate 4 which is exposed from the electrically-insulating case 2 toward the accommodation space portion 20. A connection lead 4X corresponds to a part which extends outward of the electrically-insulating case 2.

A stationary part 6B of the moving contact metal plate 6 is fixed to the second outer wall 11B of the electrically-insulating case 2. In the bimetal circuit breaker 40 shown in FIGS. 4 and 5, the stationary part 6B of the moving contact metal plate 6 is fixed to the upper end surface of the second outer wall 11B. The moving contact metal plate 6 is fixed to the second outer wall 11B by adhesion. Alternatively, the moving contact metal plate 6 is sandwiched between the second outer wall 11B and the exterior metal plate 3, and is fixed to the upper end surface of the second outer wall 11B. In the illustrated exterior case 1, the exterior metal plate 3 is fixed to the electrically-insulating case 2 with one end of the exterior metal plate 3 being arranged on and in contact with the stationary part 6B of the moving contact metal plate 6. According to this construction, since the exterior metal plate 3 is directly arranged on and in contact with the moving contact metal plate 6, it is possible to reduce the entire thickness of the circuit breaker.

Figure 4:
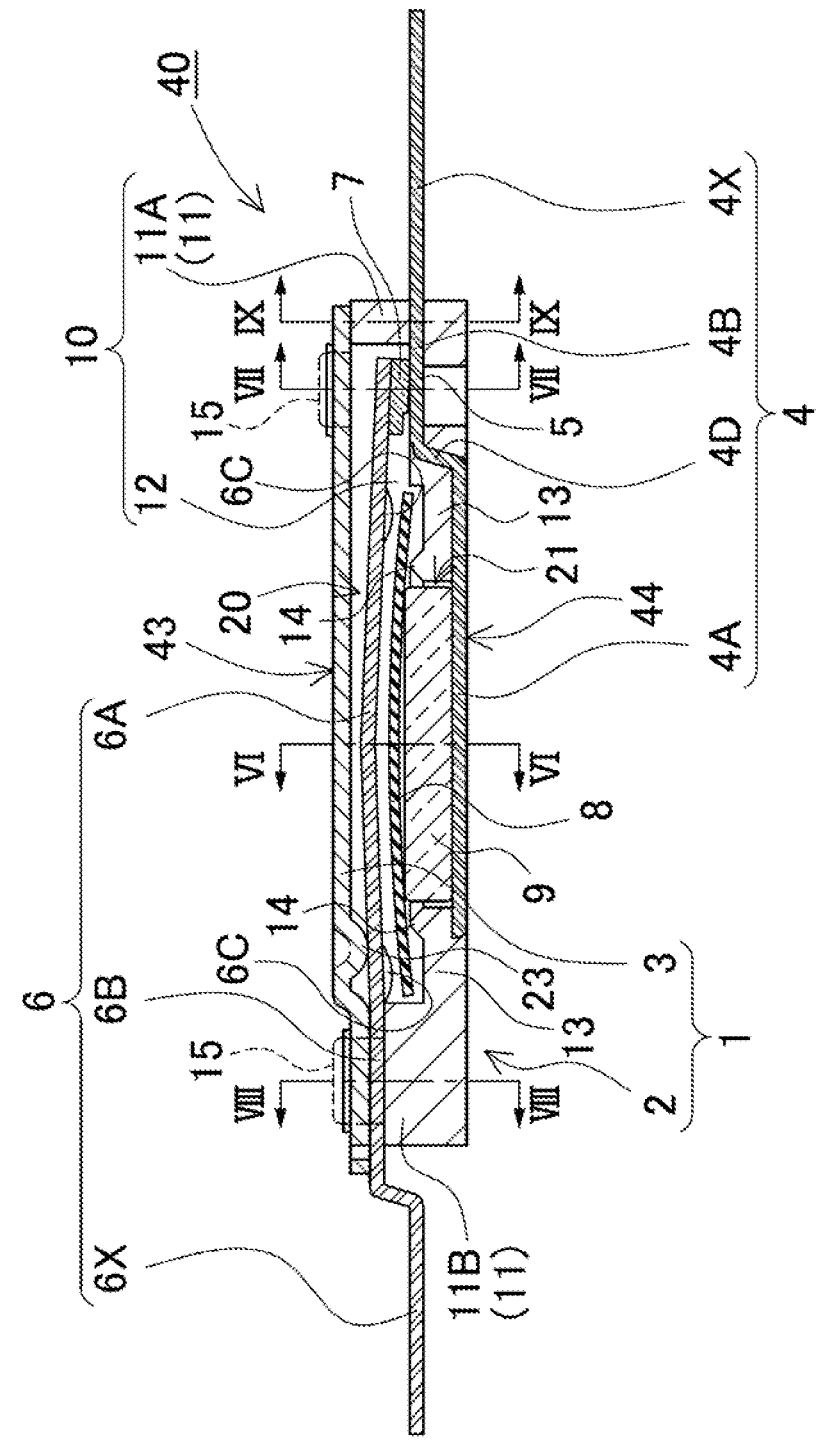
FIG. 4 is a vertically cross-sectional view of the bimetal circuit breaker shown in FIG. 3.
Figure 5:
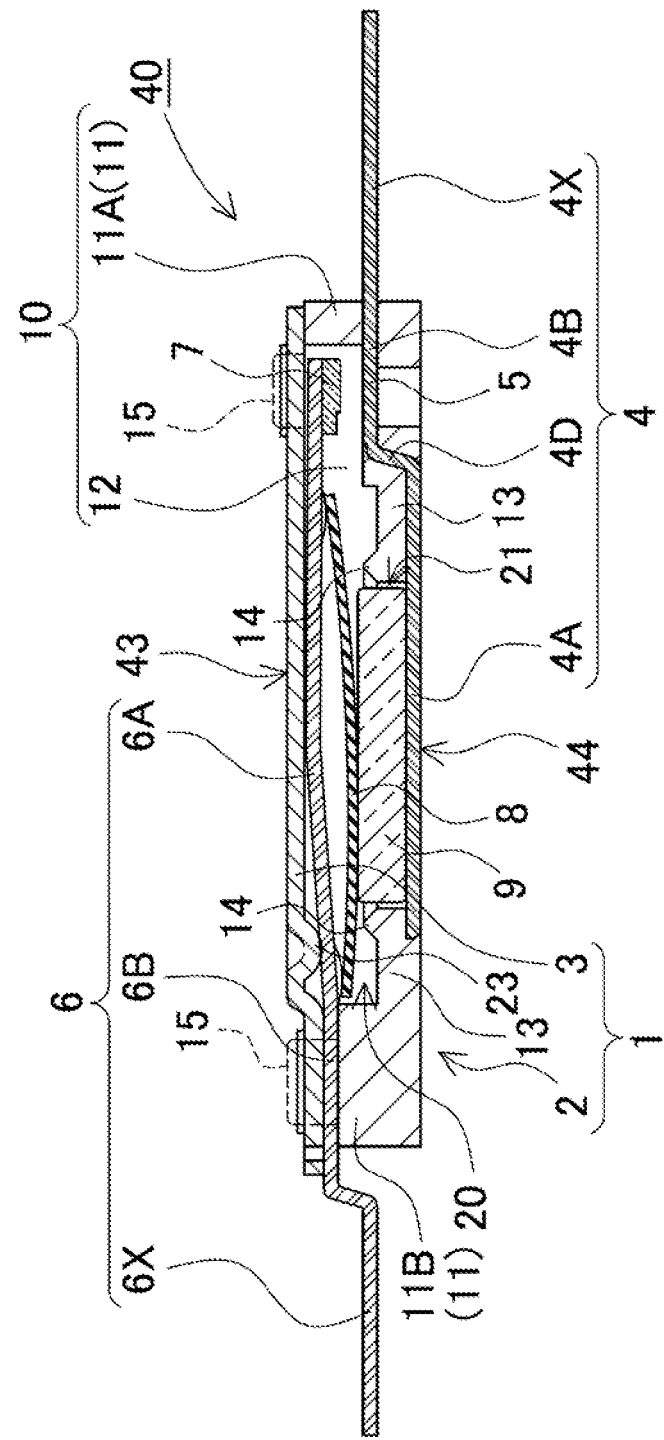
FIG. 5 is a cross-sectional view of the bimetal circuit breaker shown in FIG. 4 in the OFF state.
Figure 6:
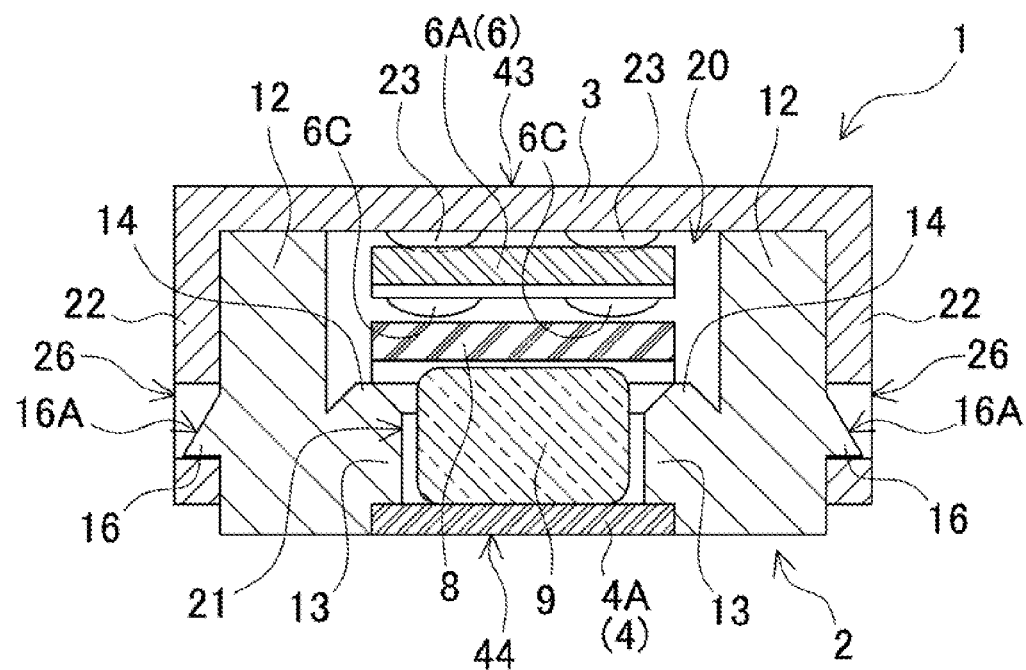
FIG. 6 is a cross-sectional view of the bimetal circuit breaker shown in FIG. 4 taken along the line VI-VI.

Also, the electrically-insulating case 2 shown in the cross-sectional views of FIGS. 4 to 6 has an accommodation recessed portion 21 which accommodates the heater 9 in the accommodation space portion 20. The accommodation recessed portion 21 is arranged in the central part of the accommodation space portion 20. The bottom of the accommodation recessed portion 21 is closed by an end part 4A of the fixed contact metal plate 4. The interior shape of the accommodation recessed portion 21 is formed slightly larger than the exterior shape the heater 9 so that the heater 9 can be inserted into the accommodation recessed portion 21. Also, the accommodation recessed portion 21 has a protruding portion 14 which extends along the peripheral edges of the accommodation recessed portion 21. When being inserted into the accommodation recessed portion 21, the heater 9 slightly protrudes from the upper surface of the protruding portion 14 so that the curved bimetal 8 is placed on the upper surface of the heater 9 with the heater 9 being thermally connected to the bimetal 8.

As for the accommodation space portion 20, the bottom of the accommodation recessed portion 21 is closed by the fixed contact metal plate 4, while the bottom outsides of the accommodation recessed portion 21 are closed by the electrically-insulating case 2 of plastic. In the electrically-insulating case 2, the fixed contact metal plate 4 is fixed by insert molding to the electrically-insulating case 2 in the bottom 13 of the plastic part which closes the bottom of the accommodation space portion 20 on the outsides of the accommodation recessed portion 21.

Again, the exterior metal plate 3 closes the upper surface of the accommodation space portion 20. The both-end parts of this exterior metal plate 3 are fixed to the outer walls 11 of the electrically-insulating case 2 not by insert molding. In the bimetal circuit breaker 40 shown in FIGS. 3 to 5, the both end parts of the exterior metal plate 3 are fixed to the upper end surfaces of the first and second outer walls 11A and 11B. The exterior metal plate 3 is fixed to the electrically-insulating case 2 through connection ribs 15 which are integrally formed with the first and second outer walls 11A and 11B. The connection ribs 15 are shown by the dashed lines in the electrically-insulating case 2 shown in FIGS. 4 and 5. The connection ribs 15 protrude from the end surfaces of the outer walls 11, and connect the exterior metal plate 3 to the electrically-insulating case 2. The exterior metal plate 3 has penetration holes 25 into which the connection ribs 15 are inserted. The exterior metal plate 3 is fixed to the electrically-insulating case 2 by inserting the connection ribs 15 into the penetration holes 25. After being inserted into the penetration holes 25, the connection ribs 15 are deformed into a flat shape by heating and pressing the connection ribs 15 or by supersonic vibration. Thus, the exterior metal plate 3 is securely fixed to the end surfaces (i.e., the upper surfaces) of the outer walls 11 of the electrically-insulating case 2. According to this construction, the exterior metal plate 3 can be accurately arranged in position, and can be easily fixed to the electrically-insulating case 2. However, the exterior metal plate may be fixed by adhesion to the upper surfaces as end surfaces of the electrically-insulating case. In the case where the exterior metal plate is fixed by adhesion to the electrically-insulating case, the exterior metal plate can have the penetration holes, and the connection ribs to be inserted into the penetration holes can be arranged on the outer walls. According to this construction, the exterior metal plate can be securely fixed in position in the electrically-insulating case by inserting the connection ribs into the penetration holes.

Figure 7:
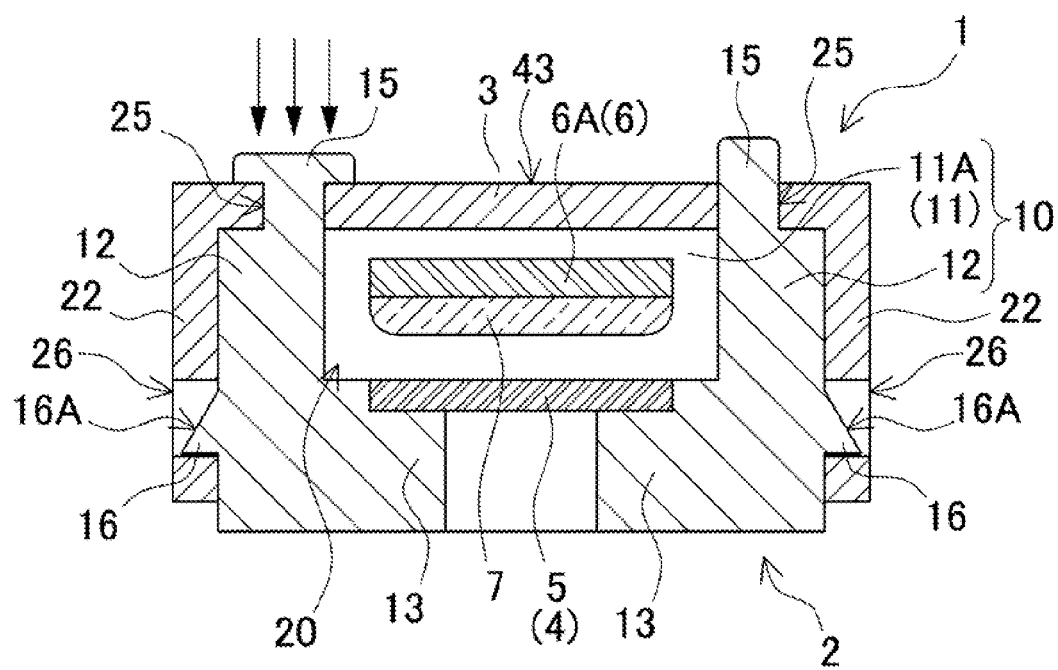
FIG. 7 is a cross-sectional view of the bimetal circuit breaker shown in FIG. 4 taken along the line VII-VII.
Figure 8:
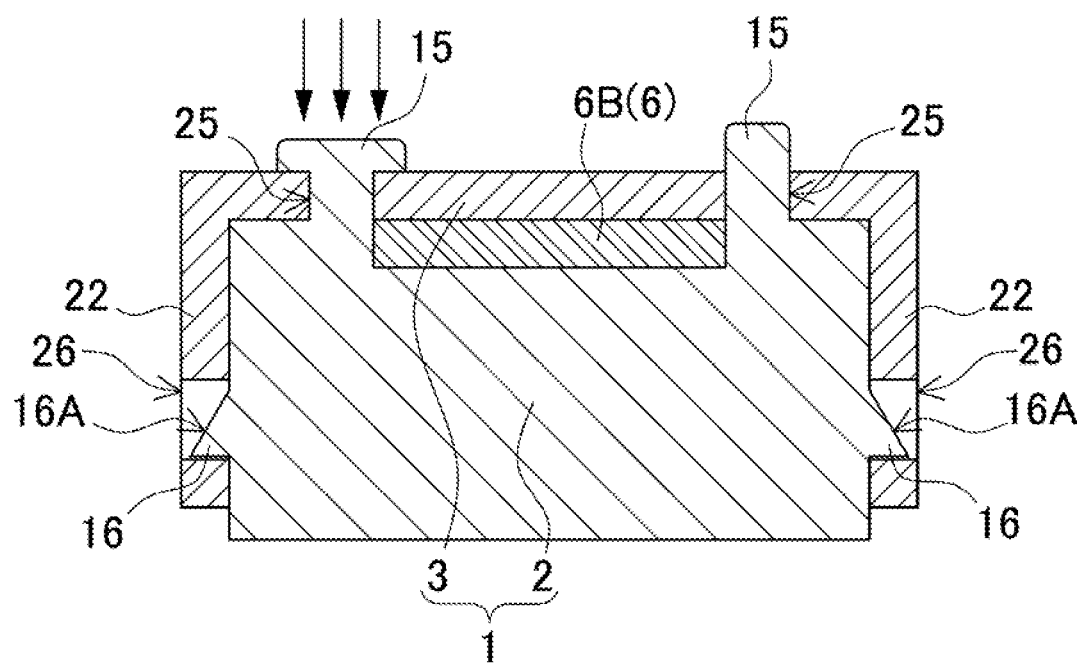
FIG. 8 is a cross-sectional view of the bimetal circuit breaker shown in FIG. 4 taken along the line VIII-VIII.

The penetration holes 25 are formed in the four corner parts of the exterior metal plate 3. The connection ribs 15 to be inserted into the penetration holes 25 are arranged on the end surfaces of the outer walls 11 of the electrically-insulating case 2. FIGS. 7 and 8 are transverse cross-sectional views of the first and second outer walls 11A and 11B, respectively, to which the exterior metal plate 3 is fixed. The first outer wall 11A shown in FIG. 7 includes the connection ribs 15 which protrude from the upper end surface of the opposed walls 12 arranged on the both sides of the accommodation space portion 20. The connection ribs 15 are formed into a shape shown in the right side of FIG. 7. After being inserted into the penetration holes 25, the ends of the connection ribs 15 are deformed into the flat shape shown in the left side of FIG. 7 so that the exterior metal plate 3 is fixed to the electrically-insulating case. Although the connection ribs 15 are arranged on the upper surfaces of the opposed walls 12 arranged on the both sides of the accommodation space portion 20 in the first outer wall 11A shown in FIG. 7, the first outer wall 11A can have the connection rib 15 which is arranged on the upper surface of the first outer wall 11A as shown in a transverse cross-sectional view of FIG. 9 taken along the line IX-IX of FIG. 4 so that the exterior metal plate 3 is fixed to the electrically-insulating case. Also, the exterior case 1 can have the connection ribs 15 which protrude from the upper surfaces of the opposed walls 12 as shown in a transverse cross-sectional view of FIG. 10 taken along the line VI-VI of FIG. 4, while the penetration holes 25 for holding the connection ribs 15 can be formed in the exterior metal plate 3 so that the central part of the exterior metal plate 3 is fixed to the electrically-insulating case 2.

In addition, bent side walls 22 are arranged on the both sides of the exterior metal plate 3 shown in the transverse cross-sectional views of FIGS. 6 to 8. The bent side walls 22 are bent along the external surfaces of the opposed walls 12. The bent side walls 22 and opposed walls 12 are connected to each other by interlock structures. The interlock structure for the bent side wall 22 and the opposed wall 12 includes an interlock protruding portion 16, and an interlock hole 26. The interlock protruding portion 16 protrudes outward of the opposed wall 12. In the illustrated exterior metal plate 3, the interlock hole 26 is arranged in the bent side wall 22, and guides and holds the interlock protruding portion 16. The interlock protruding portion 16 includes an inclined surface 16A which gradually protrudes toward the insertion direction so that the interlock protruding portion 16 can be smoothly guided into the interlock hole 26.

Figure 9:
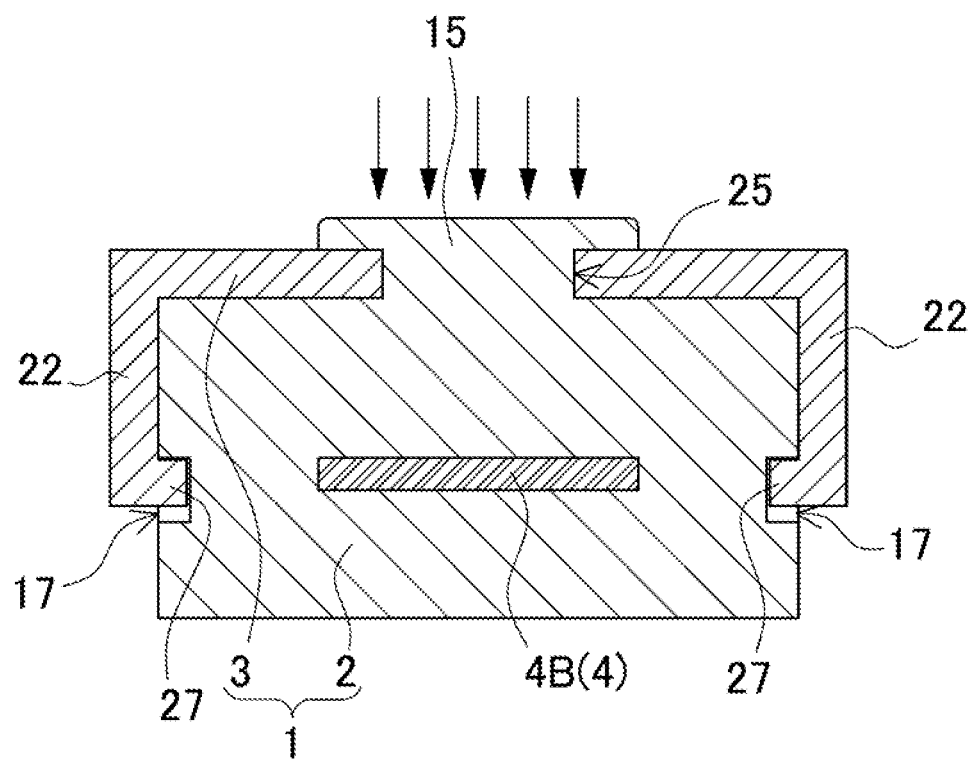
FIG. 9 is a cross-sectional view showing the another exemplary connection rib taken along the line IX-IX of FIG. 4.

Also, an interlock structure shown in FIG. 9 includes an interlock end 27, and an interlock recessed portion 17. The interlock ends 27 are bent inward of the end edges of the bent side walls 22. The interlock recessed portions 17 are the exterior surfaces of the opposed walls 12 of the electrically-insulating case 2, and guide the interlock ends 27. Thus, the interlock ends 27 are guided to the interlock recessed portions 17 so that the exterior metal plate 3 is fixed to the electrically-insulating case 2 by the interlock structures.

Figure 10:
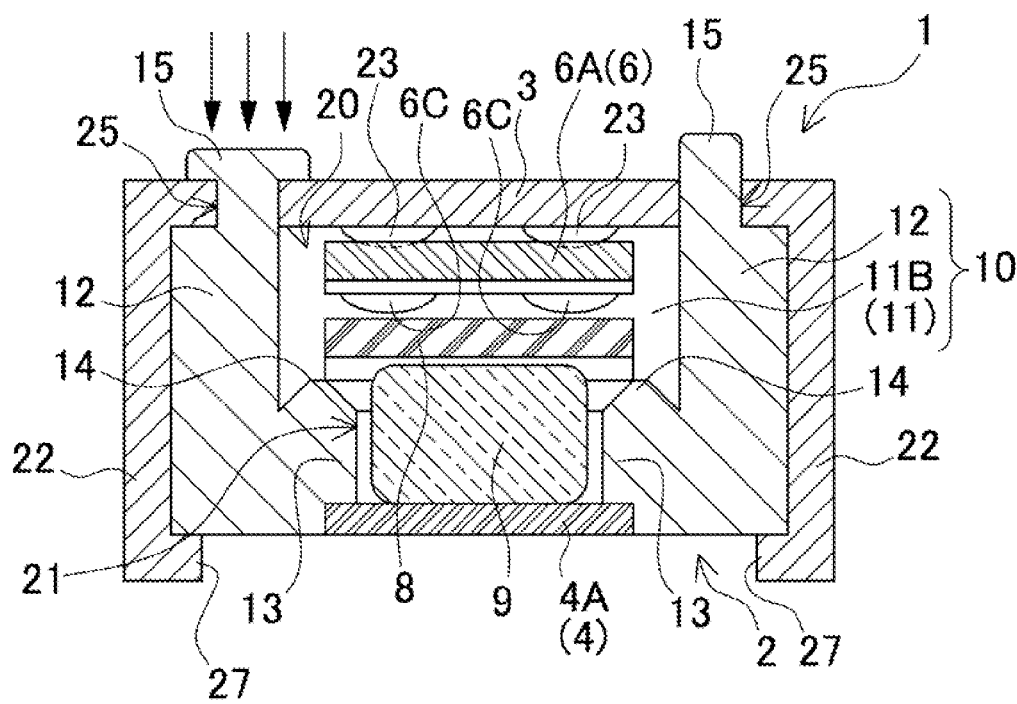
FIG. 10 is a cross-sectional view showing the another exemplary connection rib taken along the line VI-VI of FIG. 4.

Also, an interlock structure shown in FIG. 10 includes an interlock end 27. The interlock ends 27 are bent inward of the end edges of the bent side walls 22. The interlock ends 27 interlock with the bottom surfaces of the opposed walls 12 so that the exterior metal plate 3 is fixed to the electrically-insulating case 2 by the interlock structures. In these types of interlock structures, the bent side walls 22 elastically deform, and are coupled to the electrically-insulating case 2 by the interlock structures. After being coupled, the interlock protruding portions 16, or the interlock ends 27 are held at interlocking positions by elastic restoring force of the bent side wall 22, and interlock with the interlock holes 26, the interlock recessed portions 17, or the bottom surfaces.

In addition, an electrically-insulating film (not shown) is coated on the surface the exterior metal plate 3. The electrically-insulating film is formed by applying electrically-insulating paint on the surface of the exterior metal plate 3. However, the electrically-insulating layer may be formed by attaching an insulating sheet onto the surface of the exterior metal plate. In this bimetal circuit breaker 40 which includes the electrically-insulating film on the exterior metal plate 3, since the surface of the exterior metal plate 3 can be electrically insulated by the electrically-insulating film, the bimetal circuit breaker can be built in and in contact with devices.

The heater 9, the bimetal 8, and the moving part 6A of the moving contact metal plate 6 are accommodated in this order from the bottom side in the accommodation space portion 20 of the electrically-insulating case 2. The central part 4B of the fixed contact metal plate 4 is fixed to the first outer wall 11A of the electrically-insulating case 2. The stationary part 6B of the moving contact metal plate 6 is fixed to the second outer wall 11B.

The fixed contact metal plate 4 is fixed to the electrically-insulating case 2 by insert molding. The fixed contact metal plate 4 is fixed by insert molding to the electrically-insulating case 2 with the end part 4A of the fixed contact metal plate 4 being embedded in the bottom 13 of the accommodation space portion 20, and the central part 4B being embedded and extending from the bottom 13 of the accommodation space portion 20 in the first outer wall 11A of the electrically-insulating case 2. In the fixed contact metal plate 4 shown in FIGS. 4 and 5 has a stepped portion 4D is arranged between the part embedded in the first outer wall 11A and the part closing the bottom of the accommodation recessed portion 21 so that this the embedded part is arranged higher than this closing part. The stepped portion 4D is embedded in the bottom 13 of the electrically-insulating case 2. A part of the fixed contact metal plate outward of the stepped portion 4D is exposed from the upper surface of the bottom 13. This exposed part serves as the fixed contact 5.

The heater 9 generates heat, and heats the bimetal 8 when being supplied with current. The heater 9 is a PTC heater which has a certain thickness, and oval or rectangular opposed surfaces. Terminals are arranged on the upper and lower surfaces. However, the heater used in the present invention is not limited to PTC heaters. Any heater can be used which can heat the bimetal 8 when being supplied with current. In the case where the terminals of the heater 9 are arranged on the upper and lower surfaces, the lower surface is in contact with the fixed contact metal plate 4, while the upper surface is in contact with the bimetal 8 so that the upper surface can be connected to the moving contact metal plate 6 through the bimetal 8 when the bimetal 8 is heated. In the ON state where a moving contact 7 of the moving contact metal plate 6 is in contact with the fixed contact 5, the moving contact metal plate 6 and the bimetal 8 are not in contact with each other so that the current does not flow in the heater 9. On the other hand, in the OFF state where the moving contact 7 of the moving contact metal plate 6 is disconnected from the fixed contact 5, the current flows in the heater 9 through the bimetal 8 in contact with the moving contact metal plate 6, and through the fixed contact metal plate 4 so that the heater 9 generates heat whereby heating the bimetal 8. When being heated, the bimetal 8 holds the OFF state where the moving contact 7 is disconnected from the fixed contact 5, as shown in FIG. 5. Since the bimetal circuit breaker 40 keeps the moving contact 7 in the OFF state after circuit breaker 40 is switched to the OFF state, the battery pack can be safely used. The reason is that, after the bimetal circuit breaker 40 is switched to OFF when the battery pack is used in an abnormal state and becomes higher temperature than a predetermined temperature, the current continuously flows in the heater 9 from the battery of the battery pack so that the bimetal 8 is heated whereby preventing the circuit breaker 40 from returning to the ON state. The flow of current can be continuously cut off until the battery is fully discharged.

The bimetal 8 is composed of metal layers with different thermal expansion coefficients so that the bimetal 8 can deform when being heated. The bimetal 8 is arranged between the heater 9 and the moving contact metal plate 6. The bimetal 8 deforms into an inverted shape when being heated, so that the moving contact 7 is disconnected from the fixed contact 5 whereby switching the circuit breaker 40 to the OFF state. The bimetal 8 has a convex shape the center of which protrudes. In the case where the bimetal 8 does not deform due to heat, in other words, in the case where the moving contact 7 is in contact with the fixed contact 5, the central protruding portion protrudes toward the moving contact metal plate 6 as shown in FIG. 4. On the other hand, in the case where the bimetal 8 deforms due to heat into an inverted shape, the central protruding portion protrudes toward the heater 9 side, as shown in FIG. 5. When the bimetal 8 deforms into an inverted shape, as shown in FIG. 5, the central protruding portion of the bimetal 8 comes in contact with the heater 9, and the both ends of the bimetal contact and push the moving contact metal plate 6, and move the moving part 6A upward whereby disconnecting the moving contact 7 from the fixed contact 5. As a result, the circuit breaker is switched OFF.

As shown in FIGS. 4 and 5, the stationary part 6B as the central part of the moving contact metal plate 6 is fixed to the upper end surface of the second outer wall 11B. The moving part 6A as free end is arranged inside the accommodation space portion 20. An extension end of the moving contact metal plate 6 extends outward of the exterior case 1, and serves as a connection lead 6X. The stationary part 6B of the moving contact metal plate 6 is fixed by adhesion to the upper end surface of the second outer wall 11B. Also, the stationary part 6B of the moving contact metal plate 6 is sandwiched between the second outer wall 11B and the exterior metal plate 3 so that the stationary part 6B is fixed onto the upper end surface of the second outer wall 11B as shown in FIGS. 4, 5, and 8. In the illustrated bimetal circuit breaker 40, one end of the exterior metal plate 3 is arranged on and in contact with the stationary part 6B of the moving contact metal plate 6. Accordingly, the exterior metal plate 3 can serve as a contact of the moving contact metal plate 6. However, the exterior metal plate may be secured to but electrically insulated from the moving contact metal plate.

The moving contact metal plate 6 is a metal plate including the moving part 6A which can elastically deform and can be arranged in the accommodation space portion 20. In addition, the moving contact 7 is arranged on the end portion of the moving part 6A of the moving contact metal plate 6 at the position opposed to the fixed contact 5. In the case where the bimetal 8 does not deform due to heat, the moving contact 7 is in contact with the fixed contact 5 so that the moving contact metal plate 6 is held in the ON state. On the other hand, when the bimetal 8 deforms due to heat, the moving part 6A is pushed by the bimetal 8, and elastically deforms so that the moving contact 7 is disconnected from the fixed contact 5 whereby switching the moving contact metal plate 6 to the OFF state. In the bimetal circuit breaker 40 shown in FIGS. 4 and 5, a push convex portion 23 is arranged protruding from the inside surface of the exterior metal plate 3. The push convex portion 23 pushes a base-side part of the moving part 6A downward whereby surely bringing the fixed contact 5 in contact with the moving contact 7 in the case where the bimetal 8 does not deform due to heat. Since the base-side part of the moving part 6A is pushed downward by the push convex portion 23 so that the free end portion of the moving part 6A is biased downward, the moving contact 7 on the free end of the moving contact metal plate 6 can be surely brought in contact with the fixed contact 5.

In addition, protruding portions 6C are arranged on the lower surface of the moving contact metal plate 6 shown in FIGS. 4 to 6. The both ends of the bimetal 8 are in contact with the protruding portions 6C so that they push each other. The illustrated protruding portion 6C has a sectionally arc exterior shape so that the both ends of the bimetal 8 are prevented from sliding in the longitudinal direction. Thus, the both ends of the bimetal 8 can be surely brought into contact with the protruding portions 6C. As a result, they reliably push each other. A plurality of protruding portions 6C are arranged on the lower surface of the illustrated moving contact metal plate 6 at positions opposed to the both ends of the bimetal 8. According to this construction, even if the bimetal 8 is wide, the both ends of the bimetal can be surely brought into contact with the protruding portions so that they reliably push each other.

Figure 11:
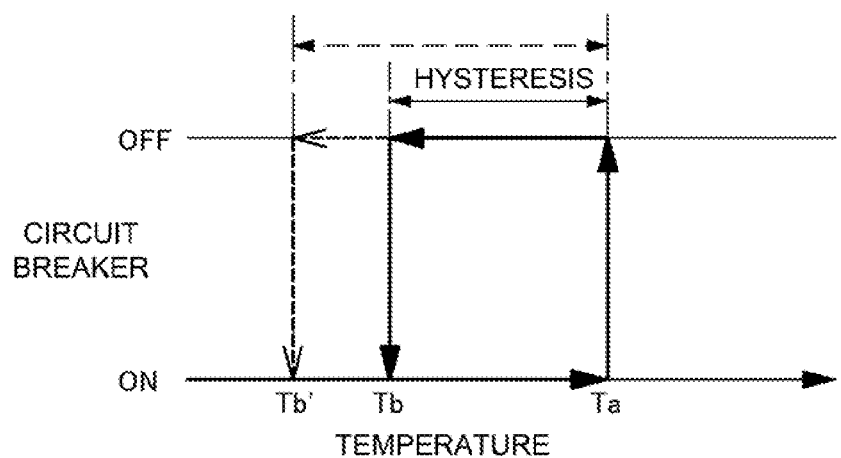
FIG. 11 is a diagram showing return temperature change before and after heat environment.

In the case where a circuit breaker can return from the current cutoff state to the ON state and operate again when the temperature decreases to a return temperature after the temperature rises to a temperature for cutting off the flow of current, it is important to keep the return temperature (Tb) constant. The circuit breaker returns to the ON state at the return temperature (Tb). However, if this circuit breaker is exposed to high temperature environment, as shown by the dashed line in FIG. 11, the elastic force of the moving contact metal plate will decrease so that the return temperature (Tb') will be lower. Accordingly, the temperature difference (Ta–Tb') will become larger between the activation temperature (Ta) for cutting off the flow of current and the return temperature (Tb'). As a result, there is a disadvantage that hysteresis will become larger. The reason for decrease of the return temperature due to elasticity reduction of the moving contact metal plate is that the moving contact metal plate elastically pushes the bimetal in the return direction (back to the original shape). That is, the bimetal will return from the inverted shape to the original shape when temperature decreases. The elastic push force of the moving contact metal plate pushes the bimetal in the return direction, which in turn facilitates returning the bimetal. Accordingly, if the elastic force of the moving contact metal plate decreases, the bimetal cannot smoothly return to the original shape. As a result, the return temperature decreases. If the return temperature of the circuit breaker decreases, for example, even when the battery temperature decreases to a battery-available temperature where a battery including the circuit breaker can be used, the circuit breaker is held in the current-cutoff state so that the battery cannot be used.

A circuit breaker is subjected to high temperature environment in assembling processes, for example, in a reflow soldering process. In the case of a conventional circuit breaker which includes the moving contact metal plate containing phosphor bronze, the return temperature (Tb') decreases by about 8° C. in the high temperature environment. As a result, this increases the temperature difference between the return temperature and the activation temperature (Ta) for cutting off the flow of current, in other words, hysteresis. If the return temperature (Tb') of a circuit breaker decreases by 8° C. so that the hysteresis become large, this circuit breaker may not return to the ON state even when the temperature decreases to a battery-available temperature where the battery can be properly used after the temperature rises so that the circuit breaker is switched to the OFF state. For this reason, there is a disadvantage that the battery cannot be conveniently used in various temperature environments. On the other hand, the return temperature of the circuit breaker can be set higher by setting the activation temperature higher. Again, the circuit breaker is switched to the OFF state at the activation temperature. However, if the activation temperature of a circuit breaker with large hysteresis is set high, there is a disadvantage that a device (e.g., battery) may not be properly protected at high temperature which includes this circuit breaker as protection device. The reason is that, even if the temperature of the battery reaches a high temperature where the flow of current is required to be cut off, the flow of current may not be cut off by the circuit breaker.

The above disadvantages can be solved by the moving contact metal plate 6 which is formed of Cu—Ni—Si group alloy containing Mg and Cr. This Cu—Ni—Si group alloy contains Cu as base material, 1.0 to 4.5 mass % (preferably, 2.0 to 2.8 mass %) of Ni, 0.2 to 1.5 mass % (preferably, 0.45 to 0.8 mass %) of Si, 0.02 to 0.4 mass % (preferably, 0.05 to 0.2 mass %) of Mg, and 0.02 to 1 mass % (preferably, 0.05 to 0.2 mass %) of Cr. Also, the Cu—Ni—Si group alloy can contain 0.1 to 0.8 mass % (preferably, 0.1 to 0.6 mass %) of Sn. In addition, the Cu—Ni—Si group alloy can contain 0.1 to 1.5 mass % (preferably, 0.3 to 0.7 mass %) of Zn.

This circuit breaker can suppress the decrease of the return temperature after being placed in high temperature environment. Table 1 shows the decrease (difference) of the return temperature of circuit breakers having the same structure except having moving contact metal plates with different materials before and after the circuit breakers are subjected to high temperature environment. This table shows the temperature difference of comparative examples 1 and 2, and an example 1. The circuit breaker according to the comparative example 1 includes the moving contact metal plate which contains phosphor bronze. The circuit breaker according to the comparative example 2 includes the moving contact metal plate formed of Cu—Ni—Si group alloy which does not contain Mg and Cr. The circuit breaker according to the example 1 includes the moving contact metal plate formed of Cu—Ni—Si group alloy which contains Mg and Cr. The temperature difference in this table is the temperature difference (Tb–Tb') shown in FIG. 11 between the return temperature (Tb) before the circuit breaker is subjected to high temperature environment, and the return temperature (Tb') after the circuit breaker is subjected to high temperature environment. Ta is measured when the contact of the circuit breaker is switched to the OFF state on the condition that the temperature of the circuit breaker rises at rate of 1° C. per minute from the normal state. After that, Tb is measured when the contact of the circuit breaker is switched to the ON state on the condition that the temperature of the circuit breaker decreases at rate of 1° C. per minute. After this measurement, the circuit breaker is placed for 40 seconds in a furnace which is heated to 250° C. After the circuit breaker is taken out of the furnace, the temperature of the circuit breaker rises at rate of 1° C. per minute until the contact of the circuit breaker is switched to the OFF state. After that, Tb' is measured when the contact of the circuit breaker is switched to the ON state on the condition that the temperature of the circuit breaker decreases at rate of 1° C. per minute.

TABLE 1

|  | Example 1 | Comp. Ex. 1 | Comp. Ex. 2 |
|---|---|---|---|
| Return Temp. Difference (Tb – Tb') [° C.] | 4.6 | 7.6 | 7.7 |

This table shows that the difference of return temperature in the circuit breaker according to this example is reduced to 4.6° C. between before and after the circuit breaker is subjected to high temperature environment. Contrary to this, the difference of return temperature in the circuit breaker according to the comparative example 1 is 7.6° C. between before and after the circuit breaker is subjected to high temperature environment. Also, the difference of return temperature in the circuit breaker according to the comparative example 2 is 7.7° C. between before and after the circuit breaker is subjected to high temperature environment. According to this result, the difference of return temperature in the circuit breaker according to this example can be reduced to 60% of the conventional circuit breakers between before and after the circuit breaker is subjected to high temperature environment. Therefore, in the circuit breaker according to this example, it is possible to suppress the hysteresis.

According to the circuit breaker according to this example, without change of the structure of the circuit breaker, change of the material of the moving contact metal plate can reduce the decrease of return temperature after the circuit breaker is subjected to high temperature environment. As a result, it is possible to suppress the hysteresis of return temperature from activation temperature. Since it is possible to suppress the hysteresis of return temperature from activation temperature after the circuit breaker is subjected to high temperature environment, the flow of current can be surely cut off if the temperature of a device to be protected such as battery abnormally rises, while the device can quickly return to the ON state and operate again when the temperature decreases to a device-available temperature.

The circuit breakers according to the above examples have the moving contact metal plate which have the following compositions.

Example 1

A circuit breaker is produced which has the structure shown in FIGS. 3 to 8, and the moving contact metal plate 6 formed of a Cu—Ni—Si group alloy containing Mg and Cr. The Cu—Ni—Si group alloy containing Mg and Cr employed in the example 1 has the following composition:
Cu 95.9 mass %
Ni 2.4 mass %
Si 0.6 mass %
Sn 0.3 mass %
Zn 0.5 mass %
Mg 0.1 mass %
Cr 0.2 mass %

Comparative Example 1

A circuit breaker is produced which has the same structure as the example 1 except that the material of the moving contact metal plate is phosphor bronze. The phosphor bronze employed in the comparative example 1 has the following composition:
Cu 92.8 mass %
Sn 7.0 mass %
P 0.03 mass %

Zn 0.1 mass %
Fe 0.06 mass %
Pb 0.01 mass %

Comparative Example 2

A circuit breaker is produced which has the same structure as the example 1 except that the material of the moving contact metal plate is a Cu—Ni—Si group alloy which does not contain Mg and Cr. The Cu—Ni—Si group alloy employed in the comparative example 2 has the following composition:
Cu 95.15 mass %
Ni 2.7 mass %
Si 0.6 mass %
Sn 0.3 mass %
Zn 1.2 mass %
Ag+B 0.05 mass %

Table 1 shows the temperature difference in the above circuit breakers according to the example 1, and the comparative examples 1 and 2. The temperature difference (Tb−Tb') is the difference between the return temperature (Tb) before the circuit breaker is subjected to high temperature environment, and the return temperature (Tb') after the circuit breaker is subjected to high temperature environment.

Ta is measured when the contact of the circuit breaker is switched to the OFF state on the condition that the temperature of the circuit breaker rises at rate of 1° C. per minute from the normal state. After that, Tb is measured when the contact of the circuit breaker is switched to the ON state on the condition that the temperature of the circuit breaker decreases at rate of 1° C. per minute.

After this measurement, this circuit breaker is placed for 40 seconds in a furnace which is heated to 250° C. After the circuit breaker is taken out of the furnace, the temperature of the circuit breaker rises at rate of 1° C. per minute until the contact of the circuit breaker is switched to the OFF state. After that, Tb' is measured when the contact of the circuit breaker is switched to the ON state on the condition that the temperature of the circuit breaker decreases at rate of 1° C. per minute.

This table shows that the difference of return temperature in the circuit breaker according to the comparative example 1 is 7.6° C. between before and after the circuit breaker is subjected to high temperature environment, and that the difference of return temperature in the circuit breaker according to the comparative example 2 is 7.7° C. between before and after the circuit breaker is subjected to high temperature environment. Contrary to these differences, the difference of return temperature in the circuit breaker according to this example is reduced to 4.6° C. between before and after the circuit breaker is subjected to high temperature environment. According to this result, in the circuit breaker according to this example, it is possible to suppress the hysteresis.

Figure 12:
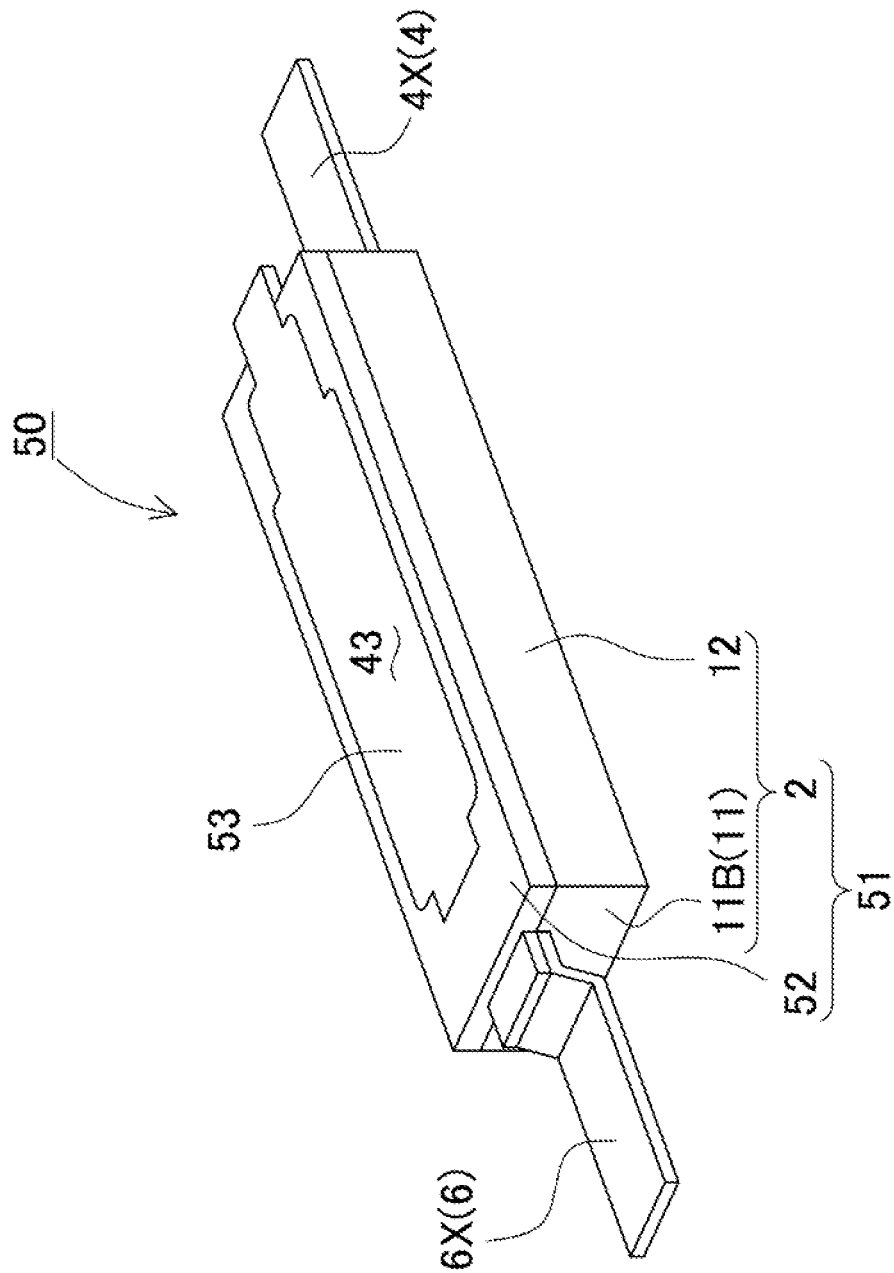
FIG. 12 is a perspective view of a bimetal circuit breaker according to another embodiment of the present invention.
Figure 13:
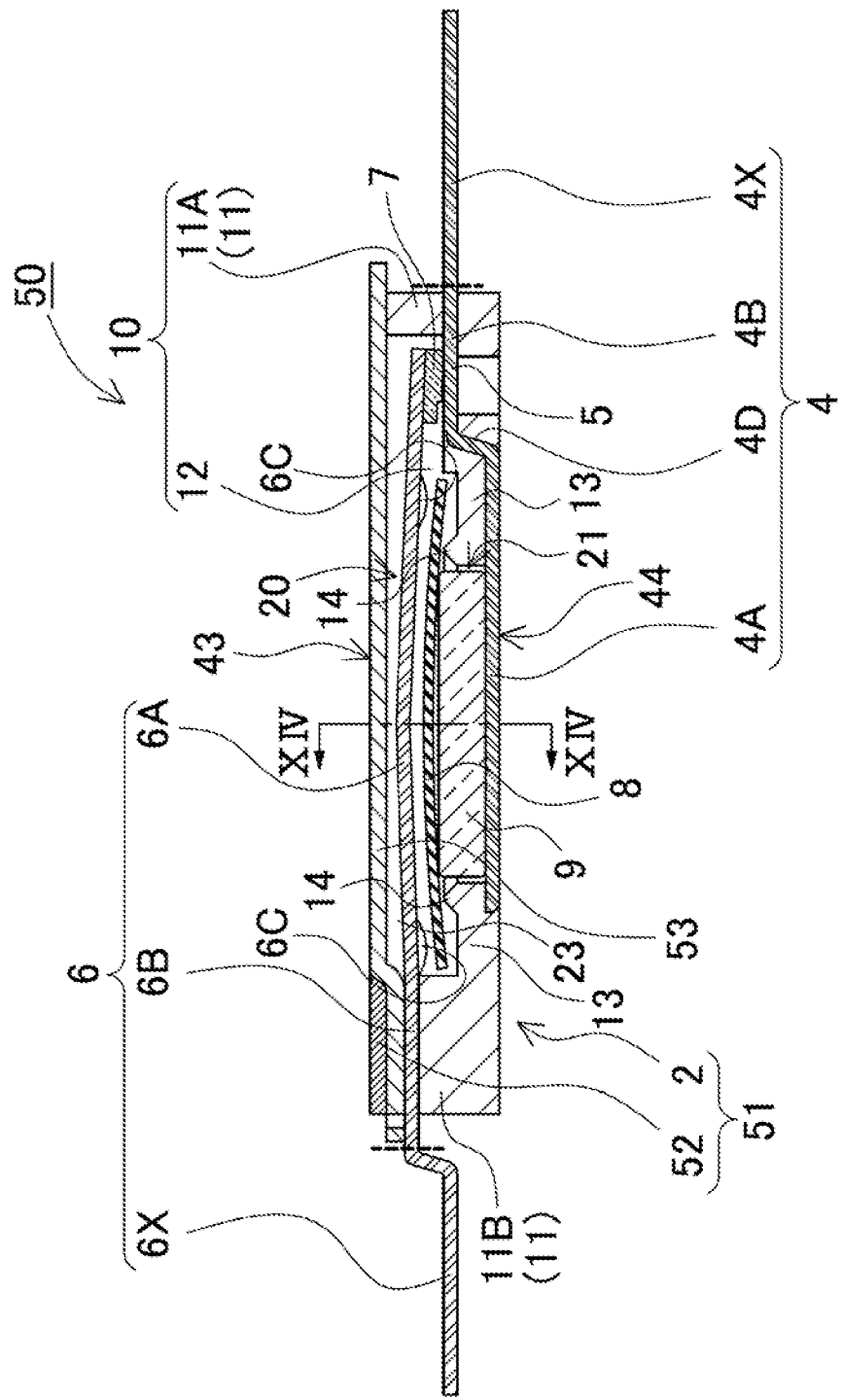
FIG. 13 is a vertically cross-sectional view of the bimetal circuit breaker shown in FIG. 12.
Figure 14:
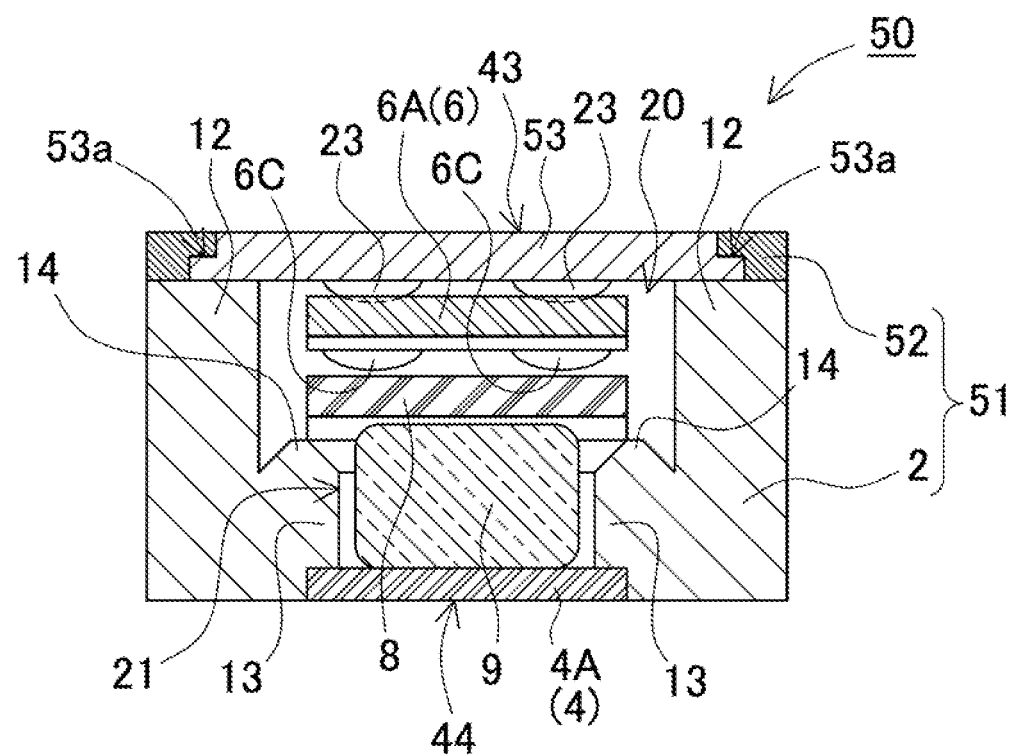
FIG. 14 is a cross-sectional view of the bimetal circuit breaker shown in FIG. 13 taken along the line XIV-XIV.
Figure 15:
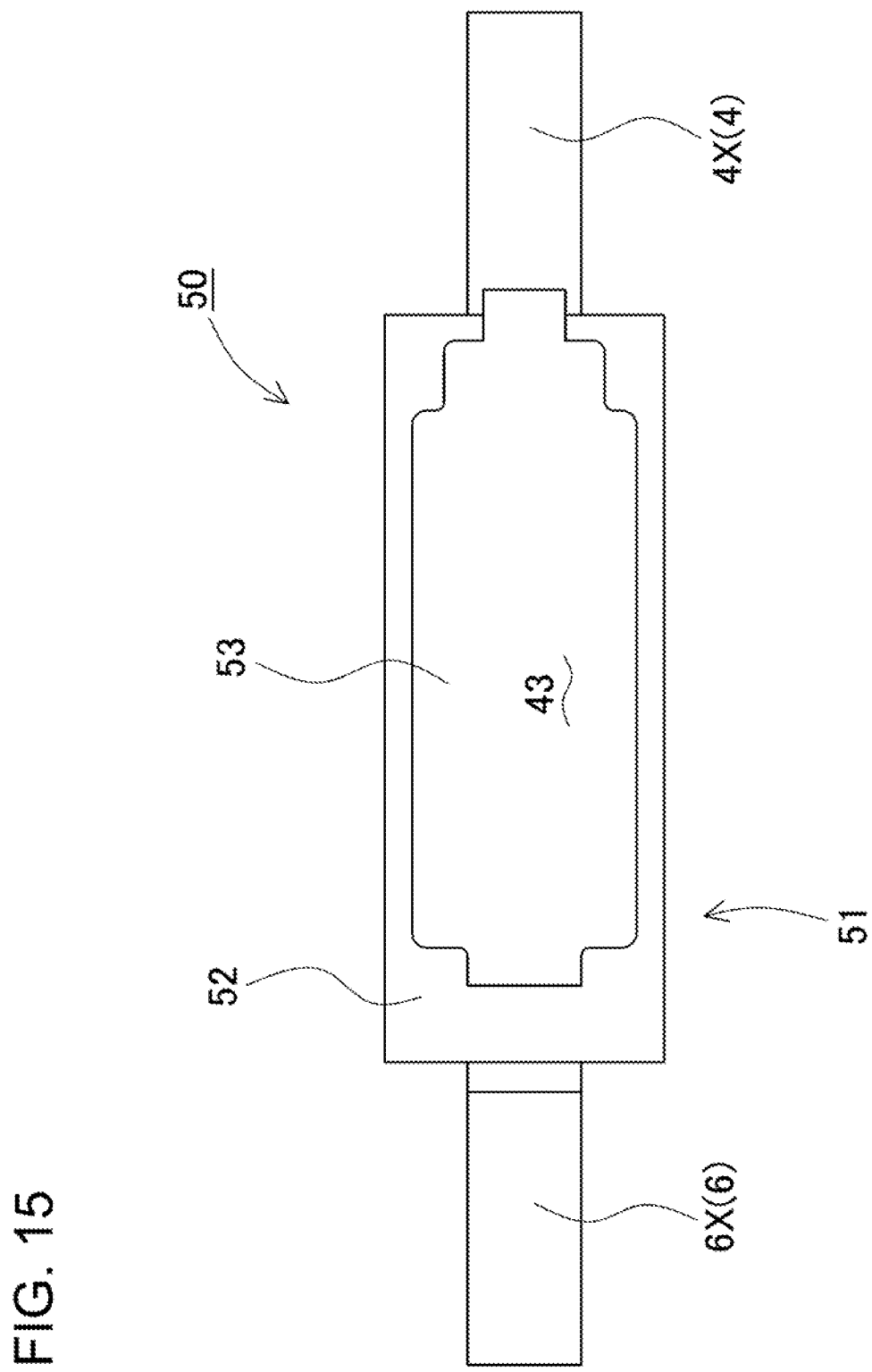
FIG. 15 is a plan view of the bimetal circuit breaker shown in FIG. 12.

In addition, a circuit breaker 50 shown in FIGS. 12 to 15 includes an exterior metal plate 53, and a connection plastic portion 52. The connection plastic portion 52 is fixed to the electrically-insulating case 2. The exterior metal plate 53 is fixed to the electrically-insulating case 2. The exterior metal plate 53 is fixed to the connection plastic portion 52 by insert molding. The exterior metal plate 53 is integrally formed with the connection plastic portion 52 by insert molding. The exterior metal plate 53 is temporarily retained in a molding chamber of a molding die for forming the connection plastic portion 52, and is fixed to the connection plastic portion 52 by injecting melted plastic into the molding chamber. The connection plastic portion 52 is fixed to the electrically-insulating case 2 by ultrasonic welding. The electrically-insulating case 2 and the connection plastic portion 52 compose an exterior case 51. However, the connection plastic portion can be fixed by adhesion or by an fitting structure to the electrically-insulating case. The connection plastic portion 52 is arranged along peripheral parts of the exterior metal plate 53. The connection plastic portion 52 is fixed to the first and second outer walls 11A and 11B, and the opposed walls 12. Again, the first and second outer walls 11A and 11B are arranged on the both ends of the electrically-insulating case 2. The exterior metal plate 53 has an exposed terminal 43 that exposes a part of the exterior metal plate 53 except the peripheral parts of the exterior metal plate 53. As shown in FIGS. 12 to 14, the upper surfaces of the exterior metal plate 53 and the connection plastic portion 52 are coplanar with each other. According to this circuit breaker 40, the exposed terminal 45 can be surely welded with being brought in contact with a lead. That is, the connection plastic portion 52 does not protrude. Accordingly, the lead to be connected by welding will not be arranged away from the exposed terminal 43. As a result, the lead can be surely and stably welded to the exposed terminal 43. In order that the upper surface of the exterior metal plate 53 can be coplanar with the upper surface of the connection plastic portion 52, the exterior metal plate 53 has a stepped portion 53a which is arranged on the periphery of the connection plastic portion 52. The upper surface of the stepped portion 53a is lower than the upper surface of other part of the exterior metal plate 53. The connection plastic portion 52 is formed on the stepped portion 53a.

Battery packs shown in FIGS. 16 to 22 include a battery portion 30 of rectangular battery. The battery portion 30 includes a metal exterior case 31. The opening of the metal exterior case 31 is closed by a metal sealing plate 32. Positive/negative electrodes are provided in the battery portion 30. The battery portion 30 stores an electrolysis solution. The sealing plate 32 is fixed to the exterior case 31 by laser welding whereby airtightly closing the opening of the exterior case 31. A protruding terminal 33 is arranged in the central part of sealing plate 32. The protruding terminal 33 is fixed to the sealing plate 32 with being electrically insulated from the sealing plate 32. The battery portion 30 is a lithium-ion battery. However, the battery portion is not limited to a lithium ion battery. Any types of rechargeable batteries such as nickel metal hydride battery can be used as the battery portion. In the case of lithium ion battery, the protruding terminal 33 serves as the negative terminal, while the sealing plate 32 and the exterior case 31 serve the positive terminal. In the case of nickel metal hydride battery, the protruding terminal serves as the positive terminal, while the sealing plate serves as the negative terminal.

In the battery pack, the battery portion 30 is serially connected to the circuit breaker 40. The circuit breaker 40 is switched from the ON state to the OFF state so that the flow of current of the battery portion 30 is cut off, if the temperature of the battery portion 30 becomes higher than a predetermined temperature. In addition, if over-current flows in the battery portion 30, the circuit breaker 40 is switched to the OFF state so that the flow of current of the battery portion 30 is cut off. In the battery pack of FIGS. 16 to 22, the circuit breaker 40 is connected between the protruding terminal 33 of the battery portion 30, and a circuit board 35. The circuit board 35 includes circuits such as a protection circuit which prevents the base batteries 30 from being over-charged/over-discharged. In addition, the circuit board 35 includes an output terminal (not shown) of the battery pack. The circuit board 35 is connected to the battery portion 30 through a lead 36 and the circuit breaker 40. In the illustrated battery pack, the lead 36 is a lead plate. However, the lead can be a lead wire.

The circuit breaker 40 is connected between the battery portion 30 and the circuit board 35. The exposed terminal 43 is arranged in the upper surface of the circuit breaker 40 included in the battery pack shown in FIGS. 16 and 17. The exposed part of the exterior metal plate 3 is provided as the exposed terminal 43. The exterior metal plate 3 is fixed to the electrically-insulating case 2 with being arranged on and in contact with the stationary part 6B of the moving contact metal plate 6. The exterior surface of the exterior metal plate 3 is exposed. This exposed part serves as the exposed terminal 43. In this battery pack, the connection lead 4X of the fixed contact metal plate 4 of the circuit breaker 40 is connected by welding to the protruding terminal 33 of the battery portion 30, while the exposed terminal 43 in the upper surface of the exterior metal plate is connected by welding to the lead 36, which is connected to the circuit board 35. In the illustrated battery pack, the lead 36 connected to the circuit board 35 is a lead plate which is bent in an L shape, and includes a bent part 36A which extends in the horizontal direction. The bent part 36A is connected by welding to the exposed terminal 43 of the circuit breaker 40. This lead 36 is connected to the circuit board 35 by soldering.

Figure 16:
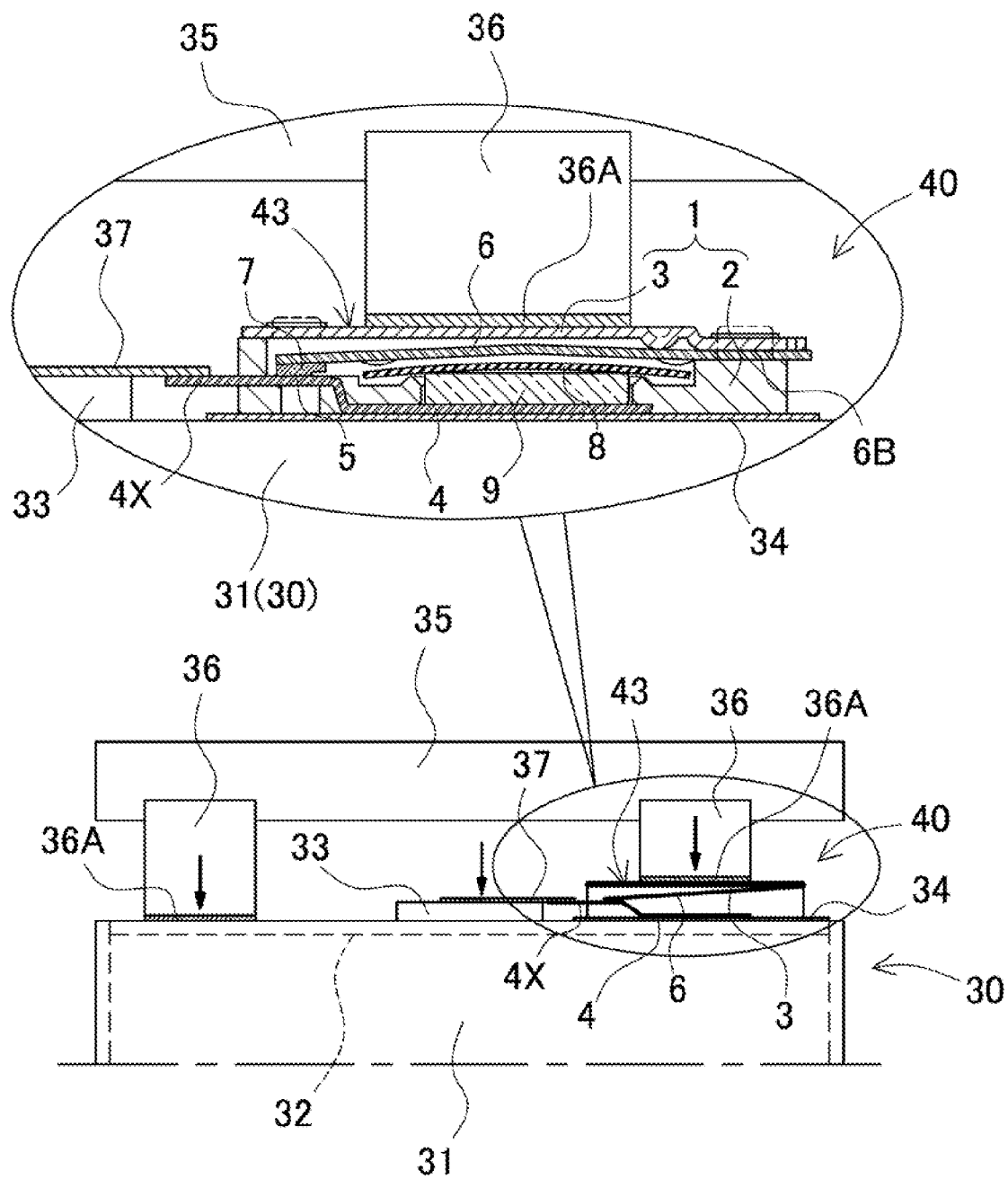
FIG. 16 is a partially enlarged sectional view of a battery pack according to an embodiment of the present invention.
Figure 17:
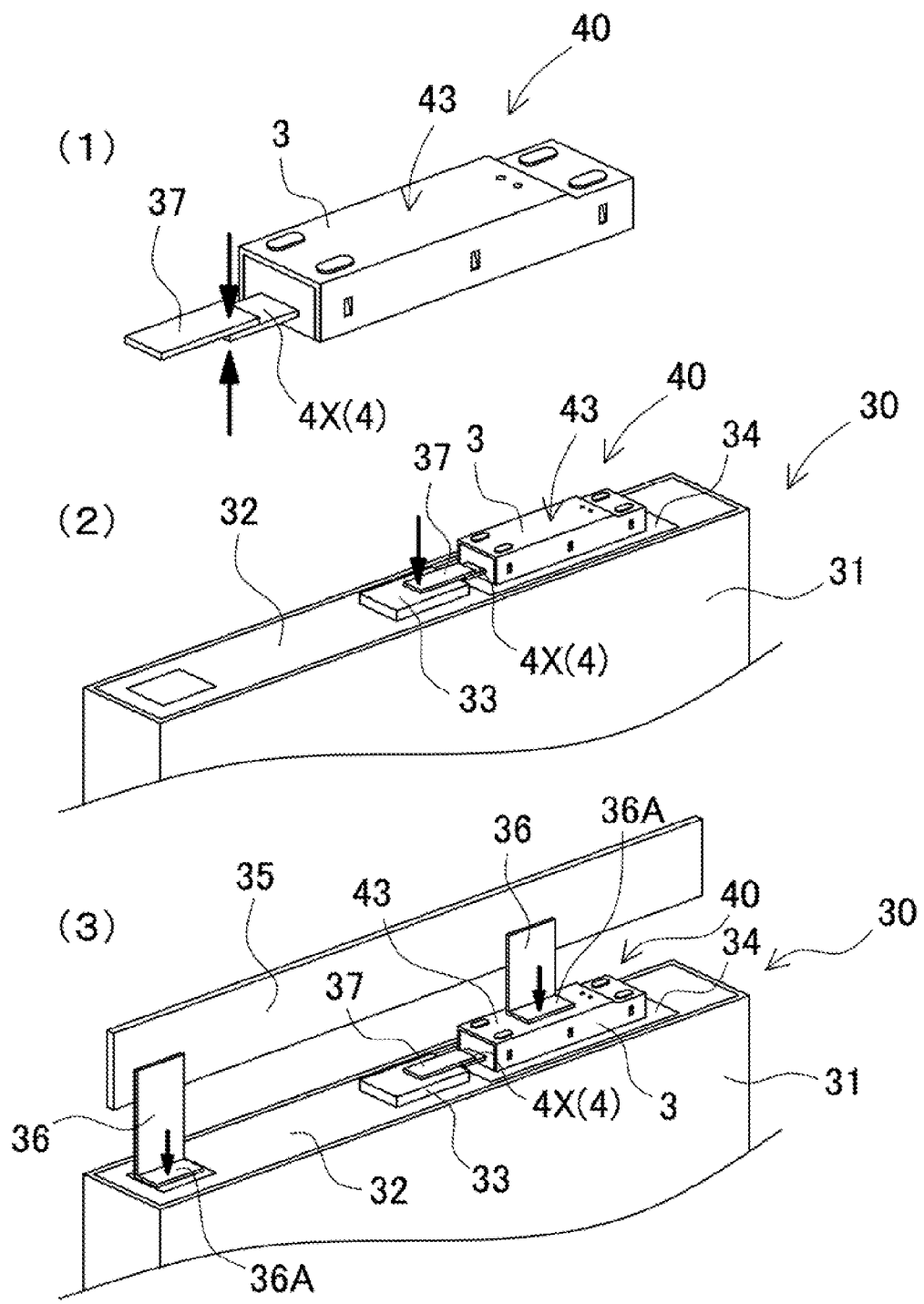
FIG. 17 is a perspective view showing the assembling process of the battery pack shown in FIG. 16.

In the circuit breaker 40 of FIGS. 16 and 17, the fixed contact metal plate 4 is connected to the protruding terminal 33 through a lead 37. The illustrated lead 37 is a lead plate. However, the lead can be a lead wire. The lead 37 connects the fixed contact metal plate 4 to the protruding terminal 33. The one end of the lead 37 is connected to the fixed contact metal plate 4 by welding, while the other end is connected to the protruding terminal 33 by welding. Although not illustrated, the connection lead of the fixed contact metal plate can protrude longer from the electrically-insulating case, and can be directly connected to the protruding terminal by welding. In addition, in the illustrated the battery pack, an electrically-insulating layer 34 is arranged between the circuit breaker 40 and the sealing plate 32 so that the circuit breaker 40 is electrically insulated from the sealing plate 32 by this electrically-insulating layer 34.

The aforementioned battery pack is assembled by the following processes.

(1) The fixed contact metal plate 4 is directly connected by welding to the protruding terminal 33 of the battery portion 30, or is connected through the lead 37 to the protruding terminal 33.

(2) The lead 36 connected to the circuit board 35 is connected by welding to the sealing plate 32 of the battery portion 30, and the exposed terminal 43 in the circuit breaker 40 upper surface.

Figure 18:
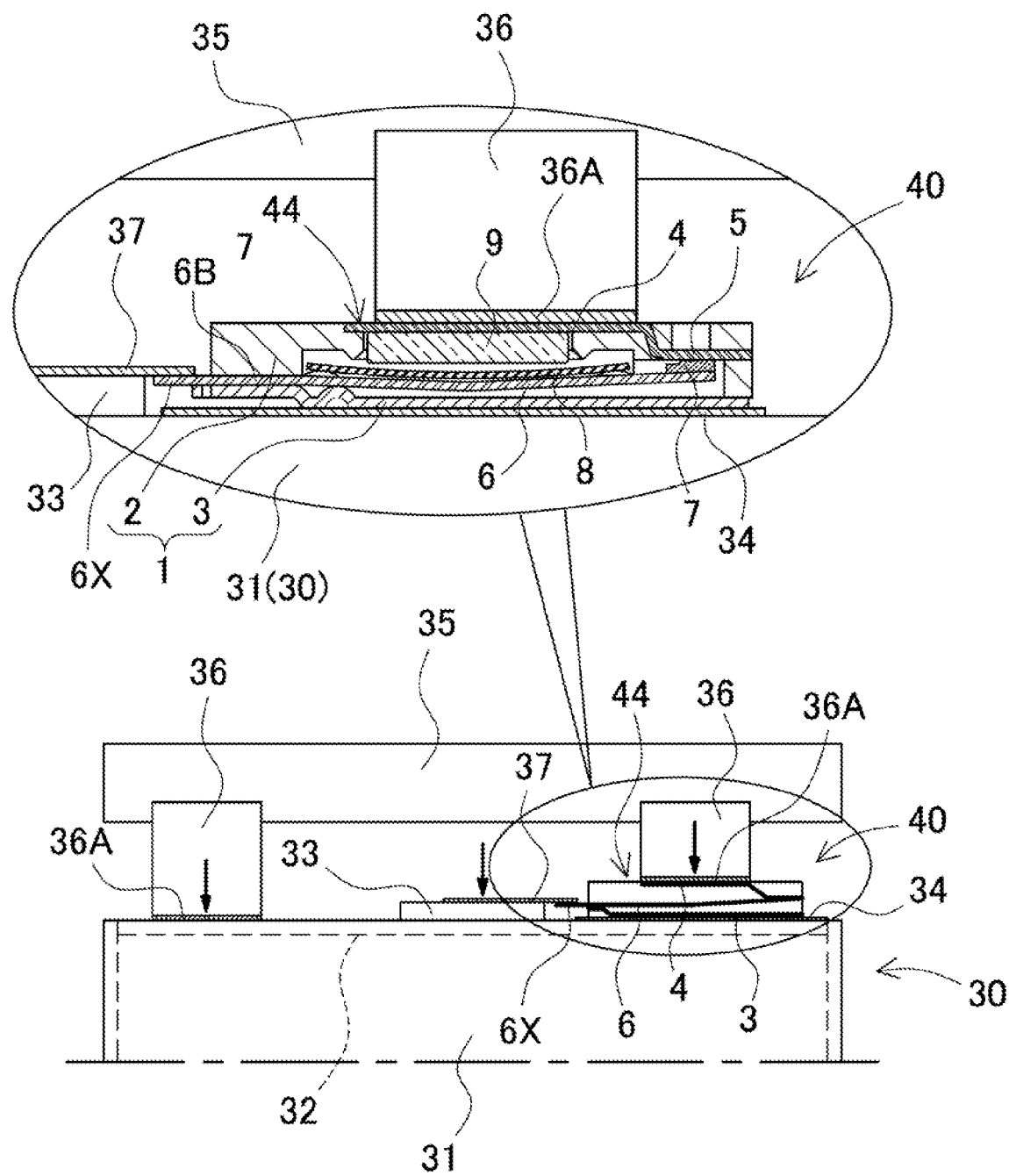
FIG. 18 is a partially enlarged sectional view of a battery pack according to another embodiment of the present invention.

The circuit breaker 40 in the battery pack of FIG. 18 is connected to the battery portion 30 by welding with being orientated upside down relative to the battery pack of FIG. 16. Specifically, in this circuit breaker 40, the fixed contact metal plate 4 is arranged on the upper surface side, while the exterior metal plate 3 is arranged on the lower surface side. As for the fixed contact metal plate 4 which is arranged on the upper surface side, a part except the both ends of the fixed contact metal plate 4 is exposed, and serves as the exposed terminal 44. This exposed terminal 44 is arranged in the upper surface of the circuit breaker 40. The exposed terminal 44 is connected by welding to the bent part 36A of the lead 36 of an L-shaped lead plate which is connected to the circuit board 35. In addition, in the circuit breaker 40, the moving contact metal plate 6 protrudes outward of the electrically-insulating case 2, and serves as the connection lead 6X. The connection lead 6X is connected by welding to the protruding terminal 33 of the battery portion 30. Although it has been described that the moving contact metal plate 6 of the circuit breaker 40 is connected to the protruding terminal 33 by welding in this battery pack, the exterior metal plate connected to the moving contact metal plate may protrude outward of the electrically-insulating case, and serve as the connection lead. In this case, this connection lead may be connected to the protruding terminal by welding. In addition, in the illustrated the battery pack, an electrically-insulating layer 34 is arranged between the circuit breaker 40 and the sealing plate 32 so that the circuit breaker 40 is electrically insulated from the sealing plate 32 by this electrically-insulating layer 34.

The aforementioned battery pack is assembled by the following processes.

(1) The exterior metal plate 3 or the moving contact metal plate 6 is directly connected by welding to the protruding terminal 33 of the battery portion 30, or is connected through the lead 37 to the protruding terminal 33.

(2) The lead 36 connected to the circuit board 35 is connected by welding to the sealing plate 32 of the battery portion 30, and the exposed terminal 44 in the circuit breaker 40 upper surface.

Figure 19:
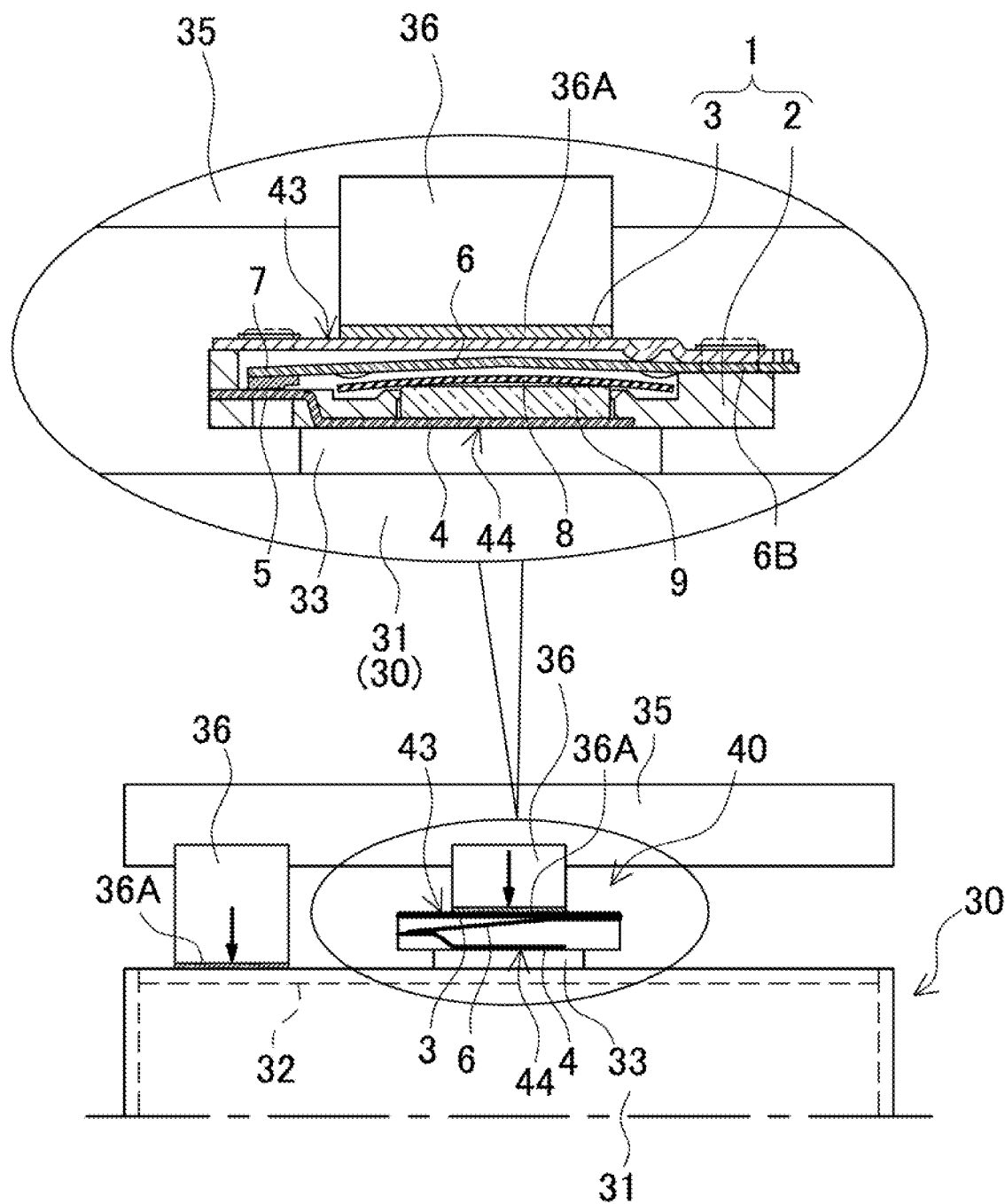
FIG. 19 is a partially enlarged sectional view of a battery pack according to another embodiment of the present invention.
Figure 20:
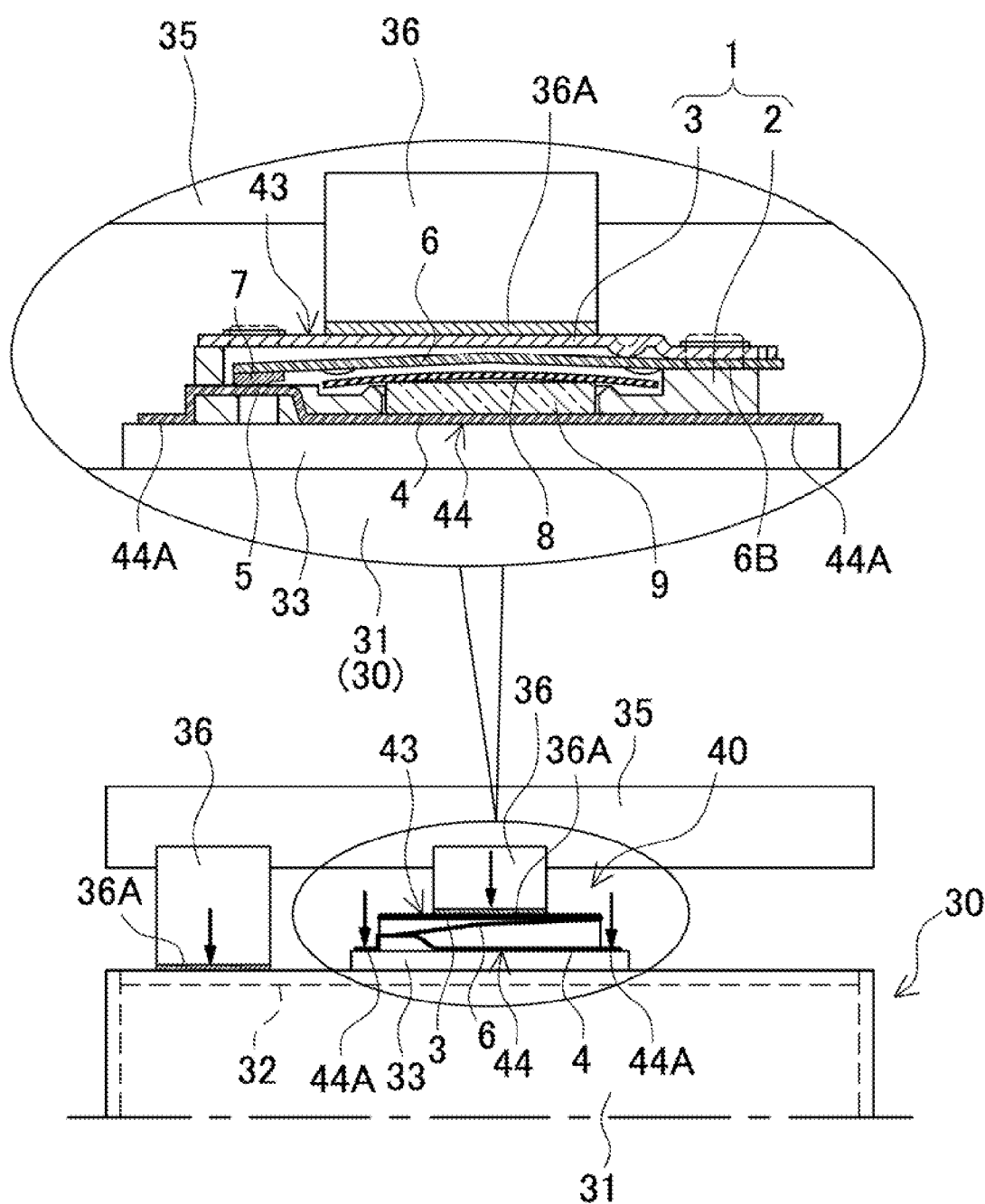
FIG. 20 is a partially enlarged sectional view of a battery pack according to another embodiment of the present invention.

In the battery pack shown in FIG. 19, the exposed terminals 43 and 44 are arranged on both surfaces of the circuit breaker 40. The exposed terminal 44 on the bottom surface side is connected to the protruding terminal 33 of the battery portion 30 by welding. The exposed terminal 43 on the upper surface side is connected by welding to the bent part 36A of the lead 36 as an L-shaped lead plate connected to the circuit board 35. Thus, in this circuit breaker 40, the exterior metal plate 3 is arranged on the upper surface side, while the fixed contact metal plate 4 is arranged on the lower surface side. The exterior metal plate 3 is arranged on and in contact with the moving contact metal plate 6. Thus, the exterior metal plate 3 is electrically connected to the moving contact metal plate 6. The exterior metal plate 3 has the exposed terminal 43 that exposes a part of the exterior metal plate 3 except the both end parts of the exterior metal plate 3. The exposed terminal 43 is connected by welding to the bent part 36A of the lead 36 of an L-shaped lead plate which is connected to the exterior metal plate 3. The fixed contact metal plate 4 on the bottom side has the exposed terminal 44 which is provided in the lower surface, and is exposed from the electrically-insulating case 2. The exposed terminal 44 of the fixed contact metal plate 4 is connected to the protruding terminal 33 of the battery portion 30 by welding. In the battery pack, the fixed contact metal plate 4 can protrude outward of the both sides of the electrically-insulating case 2, as shown in FIG. 20. The protruding parts of the fixed contact metal plate 4 can serve as exposed protruding terminals 44A. The exposed protruding terminals 44A can be connected to the protruding terminal 33 by welding.

The battery pack shown in FIG. 19 is assembled by the following processes.

The lead 36 connected to the circuit board 35 is first connected to the sealing plate 32 of the battery portion 30 by welding. Subsequently, the circuit breaker 40 is placed on the protruding terminal 33 of the battery portion 30. The exposed terminal 44 of the circuit breaker 40 is positioned on the protruding terminal 33. The lead 36 of L-shaped lead plate has been connected to the circuit board 35. The bent part 36A of the lead 36 is placed on the exposed terminal 43 in the circuit breaker 40 upper surface. Welding current flows through the bent part 36A of the lead 36, the exterior metal plate 3, the circuit breaker 40, the fixed contact metal plate 4, and the protruding terminal 33 in this order. The lead 36 connected to the circuit board 35 is connected to the exposed terminal 43 on the upper surface side by welding. The exposed terminal 44 on the lower surface side is connected to the protruding terminal 33 by welding. In order that the welding current can flow, a welding electrode is connected to the bent part 36A of the lead 36 of L-shaped lead plate, and the protruding terminal 33 of the battery portion 30 or the sealing plate 32 of the battery portion 30.

As for the battery pack shown in FIG. 20, the exposed protruding terminals 44A on the lower surface side are first connected to the protruding terminal 33 by welding so that the circuit breaker 40 is fixed to the upper surface of the protruding terminal 33. Subsequently, the leads 36 connected to the circuit board 35 are connected by welding to the sealing plate 32, and the exposed terminal 43 of the circuit breaker 40 upper surface. Thus, the battery pack shown in FIG. 20 is assembled.

Figure 21:
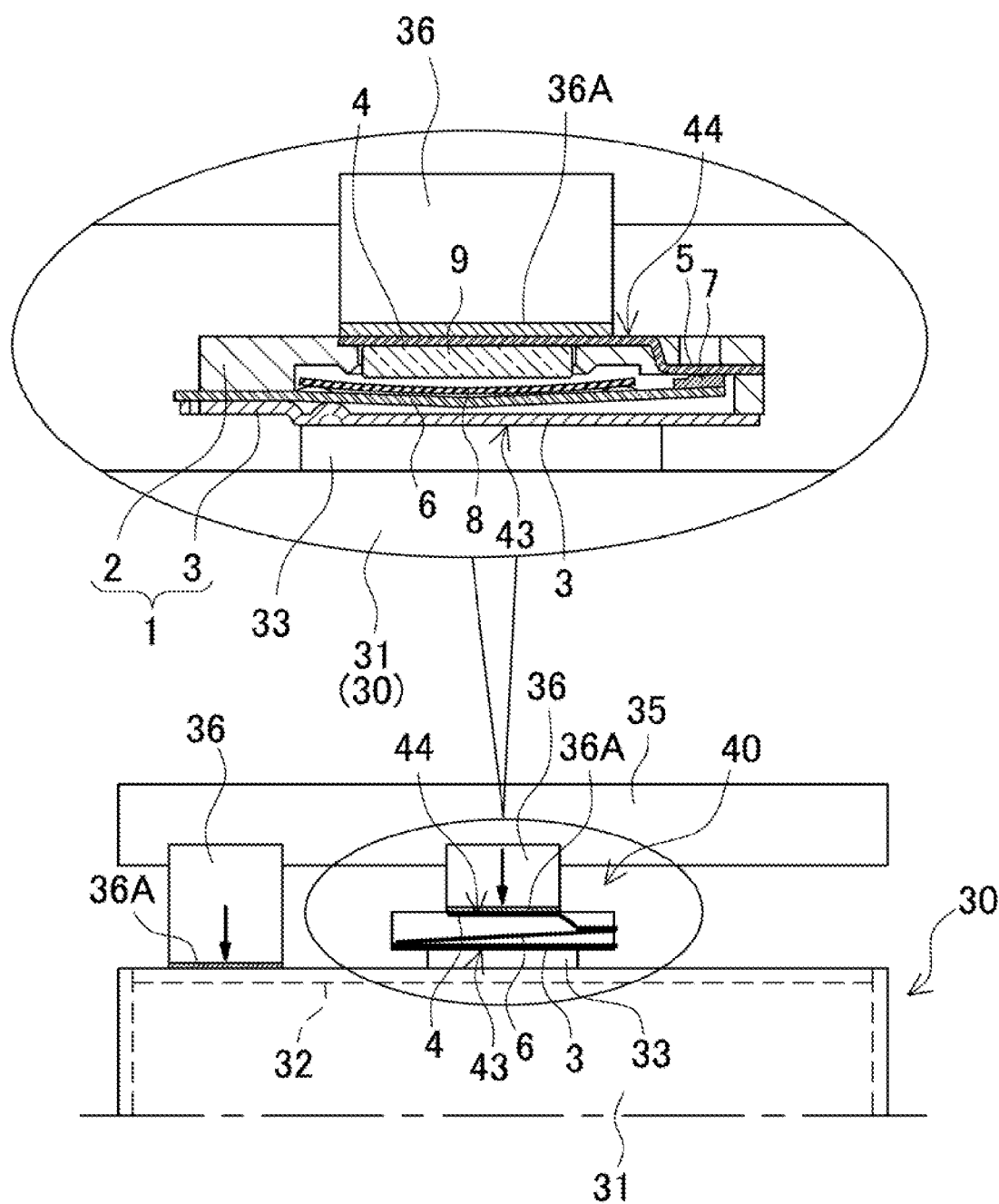
FIG. 21 is a partially enlarged sectional view of a battery pack according to another embodiment of the present invention.
Figure 22:
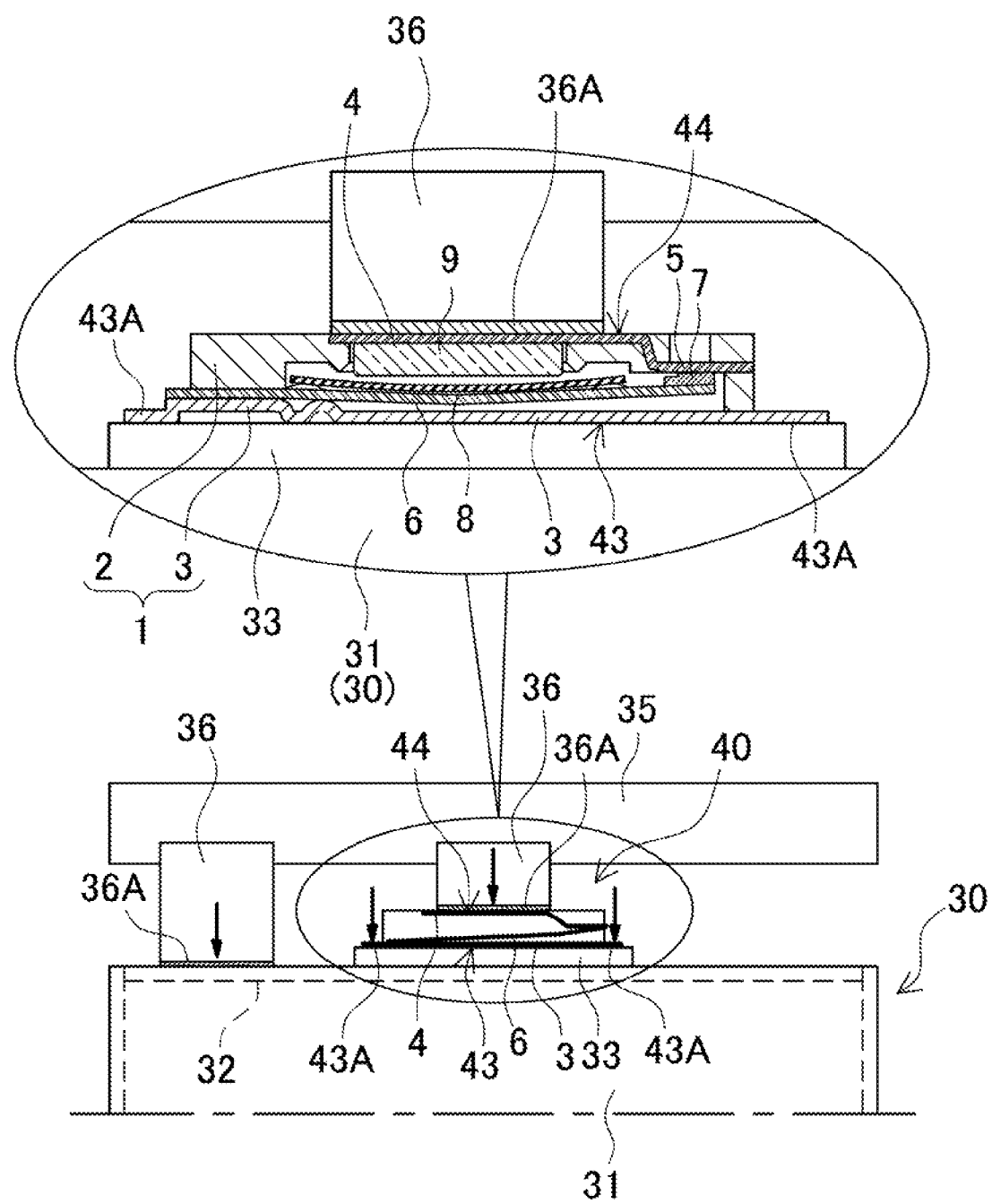
FIG. 22 is a partially enlarged sectional view of a battery pack according to another embodiment of the present invention.

The circuit breaker 40 included in the battery pack of FIG. 21 is connected to the battery portion 30 with being orientated upside down relative to the battery pack of FIG. 19. The exterior metal plate 3 is arranged in the lower surface of the circuit breaker 40, while the fixed contact metal plate 4 is arranged in the upper surface. The exposed terminals 43 and 44 are provided in the exterior metal plate 3 and the fixed contact metal plate 4, respectively. The exposed terminal 43 on the lower surface is connected to the protruding terminal 33 of the battery portion 30 by welding. The exposed terminal 44 on the upper surface side is connected by welding to the bent part 36A of the lead 36 of an L-shaped lead plate which is connected to the circuit board 35. In this circuit breaker 40, the exterior metal plate 3 is arranged on and in contact with the stationary part 6B of the moving contact metal plate 6, and is electrically connected to the stationary part 6B. A part of the exterior metal plate 3 is exposed as the exposed terminal 43. The exposed terminal 43 in the exterior metal plate 3 is arranged on the lower surface side of the circuit breaker 40. The fixed contact metal plate 4 includes the exposed terminal 44 on the fixed contact 5 side that is arranged in the upper surface of the circuit breaker and is exposed from the electrically-insulating case 2. The exposed terminal 44 on the fixed contact 5 side is connected by welding to the bent part 36A of the lead 36 of an L-shaped lead plate which is connected to the circuit board 35. The exposed terminal 43 on the exterior metal plate side is connected to the protruding electrode 33 of the battery portion 30 by welding. In the battery pack, the exterior metal plate 3 can protrude outward of the both sides of the electrically-insulating case 2, as shown in FIG. 22. The protruding parts of the exterior metal plate 3 can serve as exposed protruding terminals 43A. The exposed protruding terminals 43A can be connected to the protruding terminal 33 by welding.

The battery pack shown in FIG. 21 is assembled by the following processes.

The lead 36 connected to the circuit board 35 is connected to the sealing plate 32 of the battery portion 30 by welding. Subsequently, the circuit breaker 40 is placed on the protruding terminal 33 of the battery portion 30. The exposed terminal 43 of the circuit breaker 40 is positioned on the protruding terminal 33. The lead 36 of L-shaped lead plate has been connected to the circuit board 35. The bent part 36A of the lead 36 is placed on the exposed terminal 44 in the circuit breaker 40 upper surface. Welding current flows through the bent part 36A of the lead 36, the fixed contact metal plate 4, the circuit breaker 40, the exterior metal plate 3, and the protruding terminal 33 in this order. The lead 36 connected to the circuit board 35 is connected to the exposed terminal 44 on the upper surface side by welding. The exposed terminal 43 on the lower surface side is connected to the protruding terminal 33 by welding. In order that the welding current can flow, a welding electrode is connected to the bent part 36A of the lead 36 of L-shaped lead plate, and the protruding terminal 33 of the battery portion 30 or the sealing plate 32 of the battery portion 30.

The exposed protruding terminals 43A on the lower surface side of the battery pack shown in FIG. 22 are connected to the protruding terminal 33 by welding. The circuit breaker 40 is fixed to the upper surface of the protruding terminal 33. Subsequently, the leads 36 connected to the circuit board 35 are connected by welding to the sealing plate 32, and the exposed terminal 43 of the circuit breaker 40 upper surface. Thus, the battery pack shown in FIG. 22 is assembled.

In the manufacturing procedure of the above battery packs, the circuit breaker 40, the battery portion 30, and the lead 36 are connected to each other by spot welding, or laser welding.

The battery pack can reduce the number of leads to be used whereby reducing the part cost, and can easily and efficiently connect the lead of the circuit board whereby reducing the manufacturing cost. The reason is that the battery pack includes the exposed terminal which is arranged in the upper surface of the electrically-insulating case of the circuit breaker so that the lead connected by welding to the circuit board can be directly connected to the exposed terminal on the upper surface of the circuit breaker, which in turn can omit leads which are conventionally used for connecting the circuit board to the circuit breaker. In the battery pack, the electrically-insulating case of the circuit breaker is arranged between the exposed terminal and the battery portion with the lead of the circuit board being connected by welding to the exposed terminal on the upper surface of the circuit breaker. The electrically-insulating case is arranged between the exposed terminal and the battery portion, and electrically insulates the exposed terminal and the lead from the battery portion in the process for connecting the lead to the exposed terminal by welding. Therefore, when the lead is placed on, and is connected to the exposed terminal by spot welding or laser welding, it can be ensured that the lead can be welded with the exposed terminal being electrically insulated from the battery portion.

Figure 23:
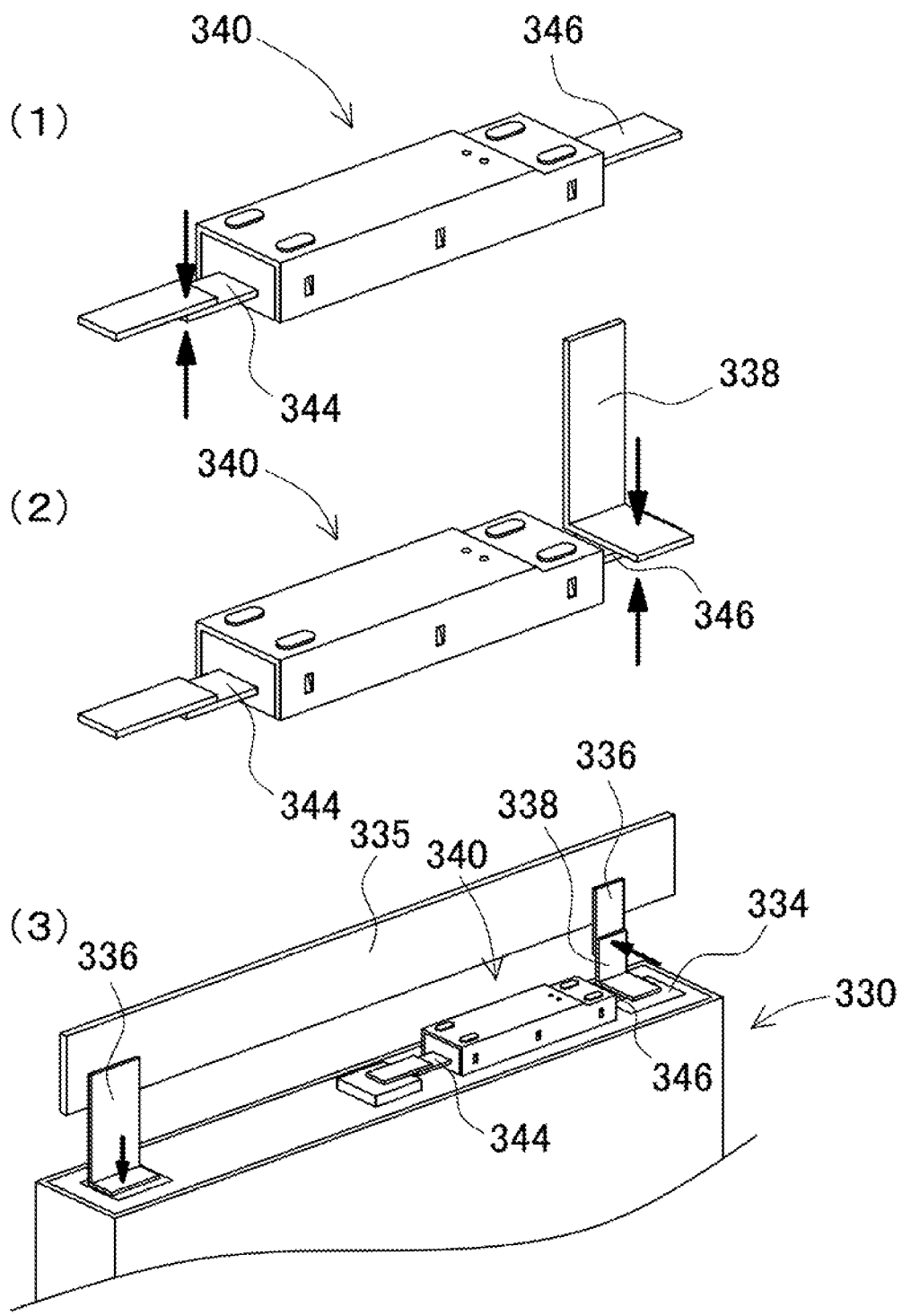
FIG. 23 is a perspective view showing the assembling processes of a related battery pack.

In the battery pack shown in FIG. 23, connection terminals 344 and 346 protrude outward of the both ends of a circuit breaker 340. A lead plate 338 is placed on and connected by welding to the one connection terminal 346. According to this construction, an electrically-insulating sheet 334 is sandwiched between the connection terminal 346 and a battery portion 330 so that the connection terminal 346 is electrically insulated from the battery portion 330. In this battery pack, the lead plate 338 cannot be weld to the connection terminal 346, which is arranged on the electrically-insulating sheet 334. The reason is that the electrically-insulating sheet 334 will be melted by the welding heat so that the lead plate 338 cannot be electrically insulated by the electrically-insulating sheet 334. For this reason, before the circuit breaker 340 is connected to the battery portion 330, the lead plate 338 with L shape is previously connected to the connection terminal 346 by welding, and subsequently a lead plate 336 of a circuit board 335 is connected to the L-shaped lead plate 338 by welding.

Contrary to this, since the aforementioned battery pack includes the exposed terminal 43 on the upper surface of the circuit breaker 40, the exposed terminal 43 can be electrically insulated from the battery portion 30 by the electrically-insulating case 2. Since the exposed terminal 43 is electrically insulated by the electrically-insulating case 2, the lead 36 can be directly welded to the exposed terminal 43 with the circuit breaker 40 being connected to the battery portion 30. The reason is that the electrically-insulating case 2 electrically insulates the exposed terminal 43 to be welded from the battery portion 30.

On the other hand, the battery pack shown in FIG. 23, when the lead plates 336 are welded, it is necessary to press a welding electrode in directions perpendicular to each other shown by the arrows in FIG. 23(3). Accordingly, it is necessary to change the orientation of the electrode of a welding device from a first orientation to an orientation perpendicular to the first orientation when the two lead plates 336 connected to the circuit board 335 are welded. For this reason, there is a disadvantage that time and effort are required when the two lead plates 336 are welded. Contrary to this, the aforementioned battery pack, since the two leads 36 can be welded with a welding electrode being pressed in the same direction shown by the arrows in FIG. 17(3), it is not necessary to change the orientation of the electrode of a welding device from a first orientation to an orientation perpendicular to the first orientation. Therefore, it is possible to efficiently and easily weld to the two leads 36.

Also, in the case where the battery pack includes the fixed contact metal plate 4 which is connected to the protruding terminal 33 of the battery portion 30 by welding, the circuit breaker 40 can be easily connected to the battery portion 30, and the lead 36 of the circuit board 35 can be connected by welding to the exposed terminal 43 of the circuit breaker 40.

Also, in the case where the battery pack includes the fixed contact metal plate 4 which is connected to the protruding terminal 33 of the battery portion 30 without the lead, the circuit breaker 40 can be connected to the battery portion 30 and the circuit board 35 without the lead.

In the case where the battery pack includes the fixed contact metal plate 4 having the exposed terminal 44 which is arranged in the lower surface of the circuit breaker 40 and exposed from the electrically-insulating case 2, and the protruding terminal 33 of the battery portion 30 onto which the exposed terminal 44 of the fixed contact metal plate 4 is connected by welding whereby fixing the circuit breaker 40 to the protruding terminal 33, the circuit breaker 40 can be connected to the battery portion 30 without the lead, and the circuit breaker 40 can be connected to the battery portion 30 without the need for electrically insulating the circuit breaker 40 and the battery portion 30 from each other.

In the case where the battery pack includes the exposed protruding terminal 44A which is provided in the exposed terminal 44 of the fixed contact metal plate 4 and protrudes outward of the electrically-insulating case 2, and the protruding terminal 33 to which the exposed protruding terminal 44A is welded, the protruding exposed terminal 44A of the circuit breaker 40 can be connected by welding to the protruding terminal 33 without flowing welding current through the circuit breaker 40.

In the case where the battery pack includes the exposed protruding terminal 43A which is provided in the exposed terminal 43 of the exterior metal plate 3 and protrudes outward of the electrically-insulating case 2, and the protruding terminal 33 of the battery portion 30 to which the exposed protruding terminal 43A is welded, the protruding exposed terminal 43A can be connected by welding to the protruding terminal 33 of the battery portion 30 without flowing welding current through the circuit breaker 40.

Battery packs shown in FIGS. 24 to 27 include a battery 60, a circuit breaker 40, and the circuit board 65. The circuit breaker 40 connected serially to this battery 60. The circuit board 65 is connected to a connection terminal 41 of the circuit breaker 40, and the battery 60 through a lead 69. The battery 60 is a polymer battery 60A including positive/negative output leads 61. The positive/negative output leads 61 are covered by an exterior film 62, and extend outward of the battery. One of the output leads 61 is connected to a connection terminal 41 of the circuit breaker 40 by welding so that the circuit breaker 40 is serially connected to the battery 60. The circuit breaker 40 includes the fixed contact metal plate 4, and the exposed terminal 43 of the exterior metal plate 3 which serve as the connection terminals 41. One of the connection terminals 41 is connected to the output lead 61 of the polymer battery 60A by welding. Another of the connection terminals 41 is connected by welding to a board lead 66 which is connected to the circuit board 65.

The bimetal circuit breaker 40 is switched to the OFF state so that the flow of current of the battery 60 is cut off, if the temperature of the battery 60 or the ambient temperature becomes higher than a predetermined temperature. Also, this circuit breaker 40 cuts off the current, if an excessive amount of current flows in the battery 60. When an excessive amount of current flows in the circuit breaker 40, the moving contact metal plate 6 is heated by Joule heat of the current so that the generated heat heats and deforms the bimetal 8. In the circuit breaker 40 which is switched to OFF by the current, in the case where the electrical resistance of the moving contact metal plate 6 is set large, the amount of current for switching the circuit breaker 40 OFF is set small. In the case where the electrical resistance of the moving contact metal plate 6 is set small, the amount of current for switching the circuit breaker 40 OFF is set large.

The battery 60 is the lithium-polymer battery 60A, which includes an exterior film, as shown in FIGS. 24 to 27. The positive/negative output leads 61 of the polymer battery 60A are covered by the exterior film 62, and are electrically insulated from the outside by the exterior film 62. The positive/negative output leads 61 extend outward of the polymer battery 60A. In the polymer battery 60A, one of the output leads 61 is connected to the connection terminal 41 of the circuit breaker 40 by welding, and is serially connected to the circuit breaker 40, while another of the output leads 61 is connected by welding to the board lead 66, which is connected to the circuit board 65.

The polymer battery 60A shown in FIGS. 24 to 27 includes a protruding wall 63 which protrudes from one of the end surfaces from which the output leads 61 extend. The protruding wall 63 is substantially coplanar with one of the surfaces of the battery. When the polymer battery 60A with the protruding wall 63 is accommodated in a battery case 70 shown by the dashed line, a space section 64 is formed by the protruding wall 63. The circuit breaker 40 is arranged in the space section 64 in proximity to and in thermal contact with the end surface of the battery 60.

In addition, an electrically-insulating holder 68 shown by the dashed line is arranged for positioning the circuit board 65 in place in the space section 64, which is formed by the protruding wall 63. The electrically-insulating holder 68 is arranged in place in the space section 64, and is formed from plastic into a shape for positioning the circuit board 65 in place. The electrically-insulating holder 68 is arranged in place by a fitting structure, by adhesion or by screws which are fastened to the battery case 70 of the battery pack, and positions the circuit board 65 in place in the space section 64.

Figure 24:
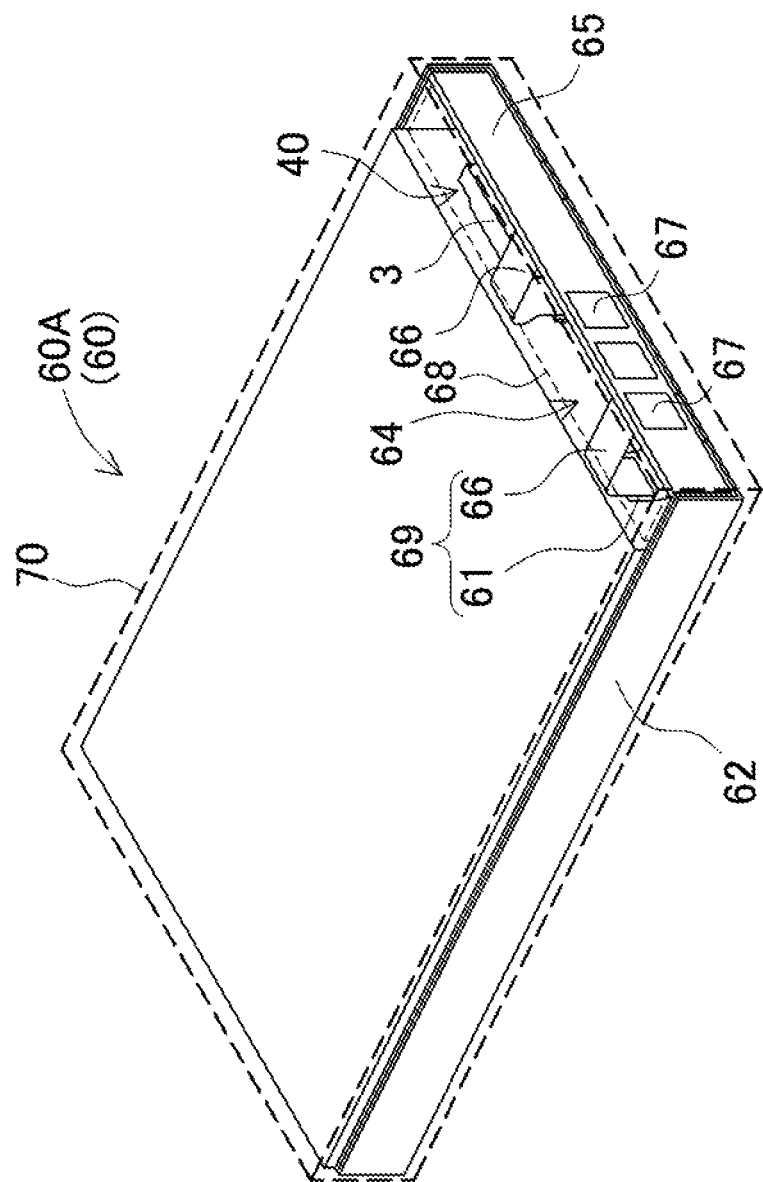
FIG. 24 is a perspective view of a battery pack according to another embodiment of the present invention.

In the battery pack shown in FIG. 24, the circuit board 65 is held on the end surface of the battery pack by the electrically-insulating holder 68. In the battery pack shown in FIG. 27, the circuit board 65 is arranged on the front side (the upper surface side in FIG. 27) of the battery 60. In the illustrated battery pack, one end of each of a pair of board leads 66 is fastened to the circuit board 65 by soldering. Another end of one of the board leads 66 is connected to the output lead 61 of the polymer battery 60A. Another end of another of the board leads 66 is connected by welding to the circuit breaker 40 and electrically connected to the output lead 61 of the polymer battery 60A through the circuit breaker 40. The circuit board 65 is arranged on the end surface side or the front side of the battery pack with the leads 69 of the board lead 66 and the output lead 61 being bent.

The circuit board 65 is connected to the battery 60, and prevents the battery 60 from being over-charged/over-discharged. In addition, the circuit board 65 includes a protection circuit (not shown) which controls the charging/discharging current so that the temperature of the battery 60 is prevented from rising higher than a predetermined temperature. Also, output terminals 67 are fixed to the surface of the circuit board 65. Electric power of the battery pack is supplied through the output terminals 67 to external devices. The protection circuit detects the voltage, the remaining capacity, the temperature of the battery 60, and the like, and controls charging/discharging current so that the battery 60 is protected. The output terminals 67 are externally exposed through electrode windows (not shown) which are formed in the battery case 70 of the battery pack. In the battery pack shown in FIG. 24, the circuit board 65 is held on the end surface of the battery pack by the electrically-insulating holder 68 so that the output terminals 67 are arranged on the end surface. In the battery pack shown in FIG. 27, the circuit board 65 is held on the front side of the battery 60 by the electrically-insulating holder 68 so that the output terminals 67 are arranged on the front side of the battery pack. The output terminals 67 are fixed in place in the battery pack by the circuit board 65 and the electrically-insulating holder 68.

Figure 27:
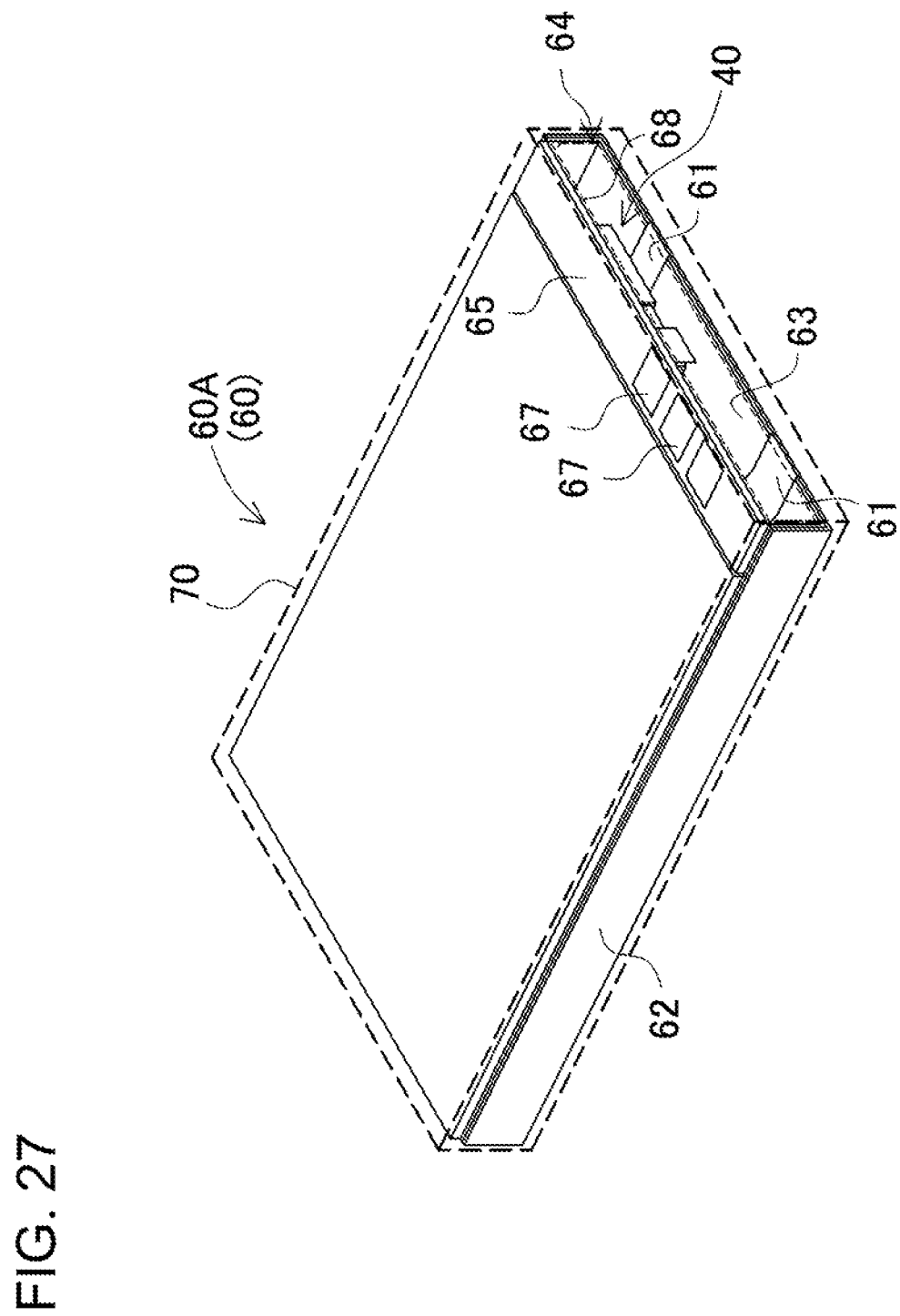
FIG. 27 is a perspective view of a battery pack according to another embodiment of the present invention.

The battery packs with the bimetal circuit breaker shown in FIGS. 24 and 27 are assembled as follows.

Figure 25:
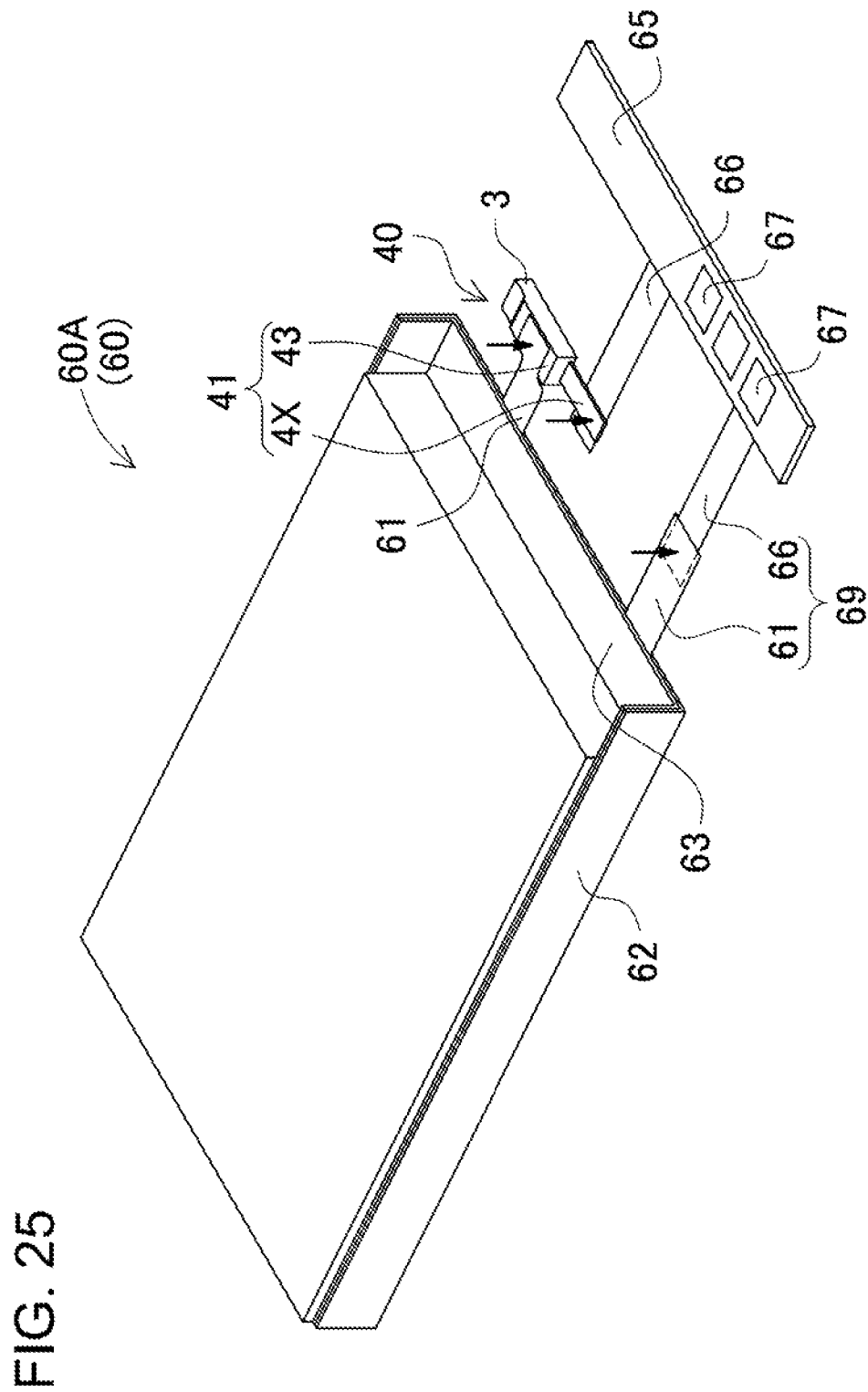
FIG. 25 is a perspective view showing the manufacturing process of the battery pack shown in FIG. 24.
Figure 26:
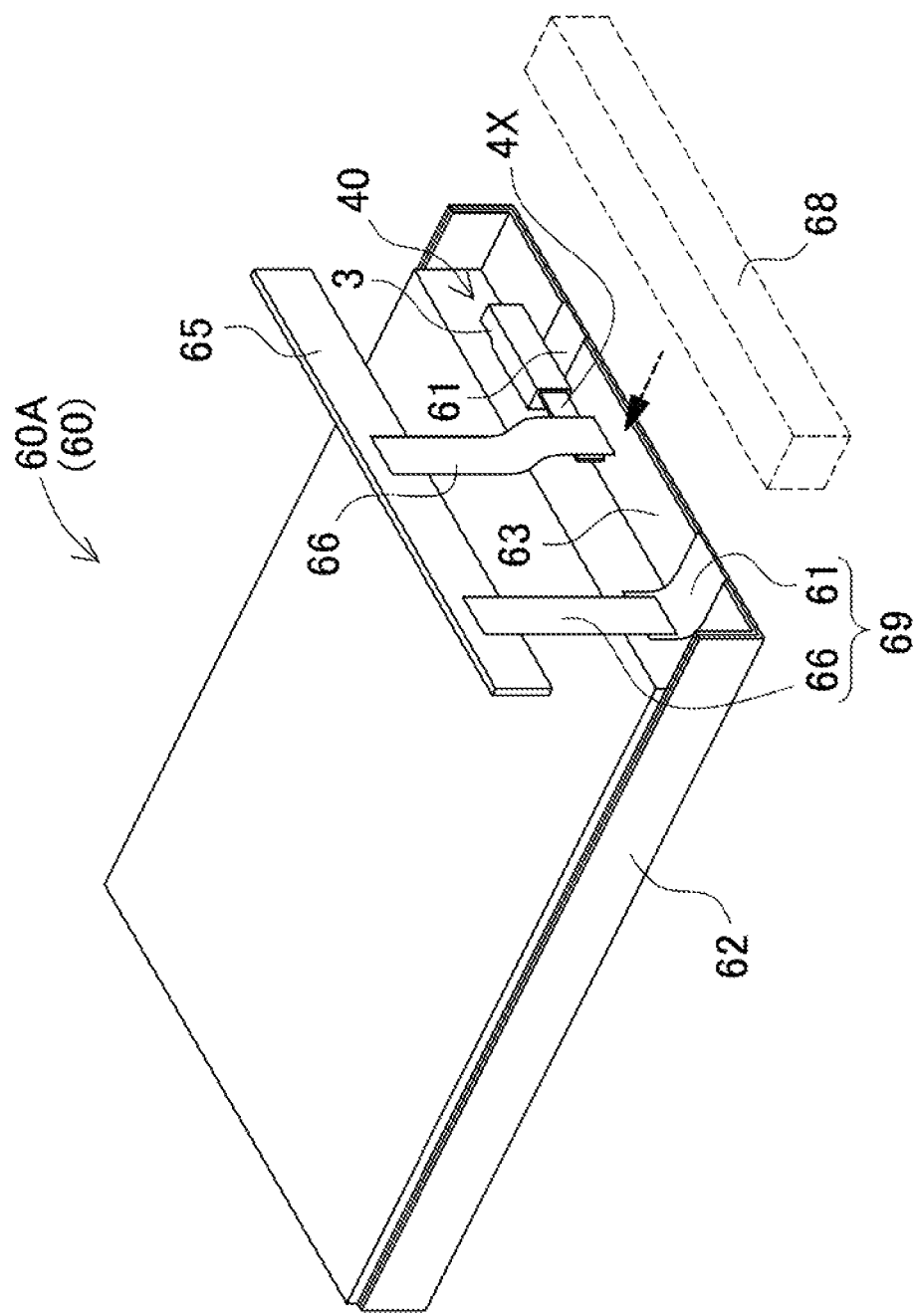
FIG. 26 is a perspective view showing the manufacturing process of the battery pack shown in FIG. 24.

(1) As shown in FIG. 25, the end of one of the output leads 61 of the polymer battery 60A is placed on and connected by spot welding to the exposed terminal 43, which is the connection terminal 41 of the circuit breaker 40. The connection lead 4X as the another of the connection terminals 41 of the circuit breaker 40 overlaps one of the board leads 66 connected to the circuit board 65. The overlap parts of the connection lead 4X and the board lead 66 are connected to each other by spot welding. The another of output leads 61 of the polymer battery 60A overlaps another of the board leads 66 connected to the circuit board 65. The overlap parts of output lead 61 and the board lead 66 are connected to each other by spot welding.

According to this process, one of the board leads 66 of the circuit board 65 is electrically connected to one of the output leads 61 of the battery 60 through the circuit breaker 40. The another of the board lead 66 is connected by welding to the another of the output leads 61 of the battery 60.

(2) Subsequently, the leads 69 of the board leads 66 and the output leads 61 are bent. The circuit board 65 is set in place in the electrically-insulating holder 68. The electrically-insulating holder 68 is set in place in the battery 60. The circuit board 65, the circuit breaker 40, and the battery 60 are arranged in place in the battery case 70.

The battery pack can reduce the number of leads to be used whereby reducing the part cost, and can easily and efficiently connect the leads 69 of the circuit board 65 whereby reducing the manufacturing cost. The reason is that the aforementioned battery pack includes the battery 60 of polymer battery 60A having the positive/negative output leads 61 which are covered by the exterior film 62 and supply electric power, and the circuit breaker 40 has the exterior metal plate 3 which is fixed to the electrically-insulating case 2 with the exterior metal plate 3 being connected to the moving contact metal plate 6 and has an exposed exterior surface as the exposed terminal 43 of one of the connection terminals 41. In this battery pack, the output lead 61 of the polymer battery 60A, or the lead 69 of the circuit board 65 can be directly connected to the exposed terminal 43 of the exterior metal plate 3 by welding. In particular, in the construction where the output lead 61 of the polymer battery 60A is directly connected to the exposed terminal 43 by welding, the heat of the battery 60 can be quickly conducted to the circuit breaker 40 through the output lead 61. For this reason, if the temperature of the battery 60 abnormally rises, the circuit breaker 40 can quickly cut off the flow of current of the battery 60. Therefore, it is possible to surely provide high safety.

On the other hand, the battery pack shown in FIG. 23, when the leads 336 are welded, it is necessary to press a welding electrode in directions perpendicular to each other shown by the arrows in FIG. 23(3). Accordingly, it is necessary to change the orientation of the electrode of a welding device from a first orientation to an orientation perpendicular to the first orientation when the two leads 336 connected to the circuit board 335 are welded. For this reason, there is a disadvantage that time and effort are required when the two leads 336 are welded. Contrary to this, the aforementioned battery pack, since all the leads 66 can be welded with a welding electrode being pressed in the same direction shown by the arrows in FIG. 25, it is not necessary to change the orientation of the electrode of a welding device from a first orientation to an orientation perpendicular to the first orientation. Therefore, it is possible to efficiently and easily weld to the two leads 66.

The exposed terminal 43 of the exterior metal plate 3 of the circuit breaker 40 is connected to the output lead 61 of the polymer battery 60A by welding. The fixed contact metal plate 4 is connected by welding to the board lead 66 which is connected to the circuit board 65.

According to this battery pack, since the output lead 61 of the polymer battery 60A is connected by welding to the exposed terminal 43 which is arranged in the exterior metal plate 3 of the circuit breaker 40, generated heat of the battery 60 is more efficiently thermally conducted to the circuit breaker 40 through the output lead 61. Accordingly, the circuit breaker 40 is quickly switched to OFF by abnormal heat in the battery 60. As a result, if the battery 60 becomes abnormal high temperature, the flow of current of the battery 60 can be quickly cut off. Therefore, it is possible to improve the safety of the battery pack.

The fixed contact metal plate 4 of the circuit breaker 40 is connected to the output lead 61 of the polymer battery 60A by welding. The exposed terminal 43 of the exterior metal plate 3 is connected by welding to the board lead 66 which is connected to the circuit board 65.

In the battery pack, generated heat of the battery 60 heats the exposed terminal of the moving contact metal plate through the radiant heat or thermal conduction, and is thermally conducted to the fixed contact metal plate 6 through the output lead 61. Therefore, if the battery 60 is heated to abnormally high temperature, the circuit breaker 40 cuts off the current so that the flow of current of the battery 60 is cut off.

The exterior metal plate 3 of the circuit breaker 40 is adhered onto the outer wall 11 of the electrically-insulating case 2, or is fixed to the outer wall 11 with the exterior metal plate 3 being penetrated by the connection ribs 15 which are integrally formed with the outer wall 11.

In this battery pack, the circuit breaker 40 can be constructed suitably for low-cost mass-production, and in addition it is possible to reduce the part cost.

The electrically-insulating case 40 includes the connection ribs 15 for connecting the exterior metal plate 3. The connection ribs 15 are integrally formed with the electrically-insulating case 2, and protrude from the end surface of the outer wall 11. The exterior metal plate 2 includes penetration holes 25 that are penetrated by the connection ribs 15, which are arranged in the electrically-insulating case 2. The exterior metal plate 3 is fixed to the electrically-insulating case 2 with the connection ribs 15 being inserted into the penetration holes 25.

In this battery pack, the exterior metal plate 3 of the circuit breaker 40 can be securely fixed to the electrically-insulating case 2.

The breaker 40 includes the penetration holes 25 that are formed in four corner parts of the exterior metal plate 3. The connection ribs 15 to be inserted into the penetration holes 25 are arranged on the end surface of the outer wall 11 of the electrically-insulating case 2.

In this battery pack, although the thickness of the external shape of the circuit breaker 40 can be small, the exterior metal plate 3 can be more securely fixed to the electrically-insulating case 2.

The circuit breaker 40 includes the stationary part 6B of the moving contact metal plate 6 that is sandwiched and fixed between the end surface of the second outer wall 11B of the exterior case 1, and the exterior metal plate 3. The penetration holes 25 are formed on the both sides of the exterior metal plate outside the fixed contact metal plate 4 and the moving contact metal plate 6.

In this battery pack, the exterior metal plate 3 of the circuit breaker 40 can be securely fixed, and the moving contact metal plate 3 can be securely fixed.

The electrically-insulating case 2 of the circuit breaker 40 includes opposed walls 12 that are arranged along the both sides of the accommodation space portion 20, and are coupled to the first and second outer walls 11A and 11B. The opposed walls 12 and the outer walls 11 compose an enclosing wall 10 for enclosing the accommodation space portion 20. The exterior metal plate 3 includes bent side walls 22 that are arranged on the both sides and are bent along the external surfaces of the opposed walls 12. The bent side wall 22 and the opposed wall 12 are connected to each other by interlock structures.

In this battery pack, although the exterior metal plate 3 of the circuit breaker 40 can be more securely fixed to the electrically-insulating case 2, it is possible to reduce the entire thickness of the bimetal circuit breaker.

In the circuit breaker 40, the interlock structures of the bent side walls 22 and the opposed walls 12 include interlock protruding portions 16 that are arranged on the exterior sides of the opposed walls 12, and interlock holes 26 that are formed in the bent side walls 22, and guide and interlock with the interlock protruding portions 16.

In this battery pack, the exterior metal plate 3 of the circuit breaker 40 can be simply and easily, but securely fixed to the electrically-insulating case.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

What is claimed is:

1. A circuit breaker comprising:
an exterior case that includes an electrically-insulating case of plastic, and an exterior metal plate;
a fixed contact metal plate that includes a fixed contact fixed to the electrically-insulating case of the exterior case;
a moving contact metal plate that is fixed to the electrically-insulating case, and includes a moving contact arranged at the position opposed to the fixed contact;
a bimetal that switches the moving contact metal plate from ON to OFF; and
a heater that heats the bimetal,
wherein the exterior metal plate and the fixed contact metal plate are arranged at positions opposed to each other and are fixed to the electrically-insulating case, wherein the heater, the bimetal and the moving contact metal plate are arranged between the fixed contact metal plate and the exterior metal plate in this order from a side of the fixed contact metal plate,
the bimetal has a convex shape a center of which protrudes, and is arranged between the heater and the moving contact metal plate with the central protruding portion protruding toward the moving contact metal plate with the moving contact being in contact with the fixed contact,
the electrically-insulating case includes a first wall and a second outer wall that protrude from both ends of the electrically-insulating case, and an accommodation space portion is formed between a first wall and a second outer wall, and accommodates the heater, the bimetal and a moving part of the moving contact metal plate, wherein the fixed contact metal plate is fixed to the first wall, and a stationary part of the moving contact metal plate is fixed to the second outer wall,
the exterior metal plate is fixed to the electrically-insulating case, and closes an opening of the accommodation space portion, and the accommodation space portion of the electrically-insulating case is closed with the exterior metal plate being exposed on an exterior surface side, and
the fixed contact metal plate comprises:
an end part being embedded in a bottom of the accommodation space portion;
a central part being embedded in the first wall of the electrically-insulating case; and
a stepped portion being arranged for causing a difference in level between the end part and the central part so that the central part is higher than the end part, the stepped portion being embedded in a bottom of the electrically-insulating case, and
wherein, at a first outer surface of the circuit breaker, the fixed contact metal plate is arranged at a same grade level as the electrically-insulating case, and the end part of the fixed contact metal plate is exposed outward to serve as a first exposed terminal at the first outer surface of the circuit breaker.

2. The circuit breaker according to claim 1,
further comprising a connection plastic portion being fixed to the electrically-insulating case, and
wherein the exterior metal plate is fixed to the connection plastic portion so that the exterior metal plate is fixed to the electrically-insulating case,
the exterior metal plate has a peripheral stepped portion being formed along a periphery of the exterior metal plate, the peripheral stepped portion being recessed from an outer surface of the exterior metal plate, the connection plastic portion is arranged along the periphery of the exterior metal plate in a contact manner with the peripheral stepped portion so that, at a second outer surface of the circuit breaker which is opposite to the first outer surface thereof, the exterior metal plate is coplanar with the connection plastic portion, and the exterior metal plate is exposed outward to serve a second exposed terminal at the second outer surface of the circuit breaker.

3. The circuit breaker according to claim 2,
wherein the fixed contact metal plate has a first connection lead which extends from the central part outward of the electrically-insulating case,
wherein the moving contact metal plate has a second connection lead which extends from the stationary part outward of the electrically-insulating case.

\* \* \* \* \*